(12) United States Patent
Wald

(10) Patent No.: US 10,395,423 B2
(45) Date of Patent: Aug. 27, 2019

(54) APPARATUS AND METHOD FOR RENDERING ADAPTIVE MESH REFINEMENT (AMR) DATA

(71) Applicant: Intel Corporation, Santa Clara, CA (US)

(72) Inventor: Ingo Wald, Salt Lake City, UT (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 15/394,786

(22) Filed: Dec. 29, 2016

(65) Prior Publication Data

US 2018/0190013 A1    Jul. 5, 2018

(51) Int. Cl.
*G06T 1/20* (2006.01)
*G06T 17/00* (2006.01)
*G06T 15/06* (2011.01)

(52) U.S. Cl.
CPC ............ *G06T 17/005* (2013.01); *G06T 15/06* (2013.01)

(58) Field of Classification Search
None
See application file for complete search history.

(56) References Cited

U.S. PATENT DOCUMENTS

| | | | | |
|---|---|---|---|---|
| 5,555,352 A * | 9/1996 | Lucas | ............ | G06T 15/06 345/423 |
| 6,137,495 A * | 10/2000 | Gondek | ............ | G06T 11/001 345/600 |
| 8,169,434 B2 * | 5/2012 | Zhou | ............ | G06F 17/30961 345/419 |
| 2005/0285858 A1 * | 12/2005 | Yang | ............ | G06T 15/08 345/420 |
| 2006/0066611 A1 * | 3/2006 | Fujiwara | ............ | G06T 15/06 345/419 |
| 2006/0170682 A1 * | 8/2006 | Van Liere | ............ | G06T 1/60 345/427 |
| 2006/0238534 A1 * | 10/2006 | Matsumoto | ............ | G06T 15/08 345/420 |
| 2007/0040833 A1 * | 2/2007 | Buyanovski | ............ | G06T 15/06 345/426 |
| 2007/0262988 A1 * | 11/2007 | Christensen | ............ | G06T 15/08 345/424 |
| 2008/0024493 A1 * | 1/2008 | Bordoloi | ............ | G06T 15/08 345/423 |

(Continued)

OTHER PUBLICATIONS

Kahler et al., Texture-based Volume Rendering of Adaptive Mesh Refinement Data, Nov. 2002, The Visual Computer, 18:481-492.*

(Continued)

*Primary Examiner* — Anh-Tuan V Nguyen
(74) *Attorney, Agent, or Firm* — Nicholson De Vos Webster & Elliott LLP

(57) ABSTRACT

An apparatus and method are described for rendering adaptive mesh refinement data. For example, one embodiment of a graphics processing apparatus comprises: a tree data structure generator to transform adaptive mesh refinement (AMR) data into a multi-octree or kd-tree data structure, respectively; an interpolator to implement an interpolation scheme based on the multi-octree or kd-tree data structure to generate interpolated results, the interpolation scheme using repeated linear interpolation; and a ray tracing-based renderer to use the interpolated results to render image frames using ray tracing techniques.

8 Claims, 20 Drawing Sheets

(56) References Cited

U.S. PATENT DOCUMENTS

| | | | | |
|---|---|---|---|---|
| 2008/0238919 | A1* | 10/2008 | Pack | G06T 15/04 345/420 |
| 2008/0259080 | A1* | 10/2008 | Masumoto | G06T 15/08 345/426 |
| 2009/0284537 | A1* | 11/2009 | Hong | G06T 1/60 345/522 |
| 2013/0321399 | A1* | 12/2013 | Rohlf | G06T 17/05 345/419 |
| 2014/0368504 | A1* | 12/2014 | Chen | G06T 17/005 345/424 |
| 2015/0228110 | A1* | 8/2015 | Hecht | G06T 15/08 345/419 |
| 2015/0262416 | A1* | 9/2015 | Hecht | G06T 17/005 345/424 |
| 2016/0057454 | A1* | 2/2016 | Bordes | H04N 19/50 375/240.12 |
| 2016/0292902 | A1* | 10/2016 | Milne | G06T 9/40 |
| 2016/0292908 | A1* | 10/2016 | Obert | G06T 1/20 |
| 2018/0114357 | A1* | 4/2018 | Shane | G06T 15/30 |

OTHER PUBLICATIONS

Andries Van Dam, "Acceleration Data Structures", CS123—Introduction to Computer Graphics, Nov. 6, 2014, pp. 1-37.

Berger M.J., et al., "Local Adaptive Mesh Refinement for Shock Hydrodynamics," Journal of Computational Physics, vol. 82, 1989, pp. 64-84.

Glough K., et al., "GRChombo: Numerical Relativity with Adaptive Mesh Refinement," General Relativity and Quantum Cosmology (gr-qc), Feb. 8, 2016, pp. 1-48.

Drebin R.A., et al., "Volume Rendering," Computer Graphics, vol. 22 (4), Aug. 1988, pp. 65-74.

Franke R., et al., "Smooth Interpolation of Large Sets of Scattered Data," Numerical Methods in Engineering, vol. 15, 1980, 41 pages.

Gunther H.W., et al., "Extraction of Crack-free Isosurfaces from Adaptive Mesh Refinement Data," Proceedings of the Joint EUROGRAPHICS and IEEE TCVG Symposium on Visualization, 2001, pp. 1-20.

Kreylos O., et al., "Remote Interactive Direct Volume Rendering of AMR Data," Lawrence Berkeley National Laboratory, Mar. 28, 2002, 9 pages.

Lorensen W.E, et al., "Marching Cubes: A High Resolution 3D Surface Construction Algorithm," General Electric Company, Computer Graphics, vol. 21 (4), Jul. 1987, pp. 163-169.

Marchesin S., et al., "High-Quality, Semi-Analytical Volume Rendering for AMR Data," IEEE Transactions on Visualization and Computer Graphics, vol. 15 (6), Nov./Dec. 2009, pp. 1611-1618.

O'Shea B.W., et al., "Introducing Enzo, an AMR Cosmology Application," Retrieved from https://researchgate.net/publication/227083242, Springer, 2005, pp. 341-349.

Pharr M., et al., "ISPC: A SPMD Compiler for High-Performance CPU Programming," In Proceedings of Innovative Parallel Computing (inPar), 2012, pp. 184-196.

Wald I., et al., "Faster Isosurface Ray Tracing Using Implicit KD-Trees," IEEE Transactions on Visualization and Computer Graphics, vol. 11 (5), 2005, pp. 1-11.

Wald I., et al., "Interactive Rendering with Coherent Ray Tracing," Eurographics, vol. 20 (3), 2001, pp. 153-164.

Wald I., et al., "OSPRay—A CPU Ray Tracing Framework for Scientific Visualization," Proceeding of IEEE SciVis, 2016, pp. 1-10.

* cited by examiner

FIG. 9A  GRAPHICS PROCESSOR COMMAND FORMAT
900
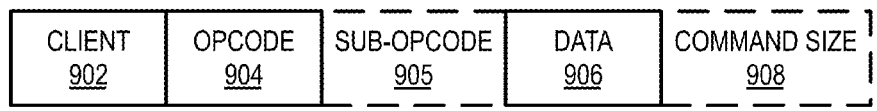
FIG. 9B  GRAPHICS PROCESSOR COMMAND SEQUENCE
910
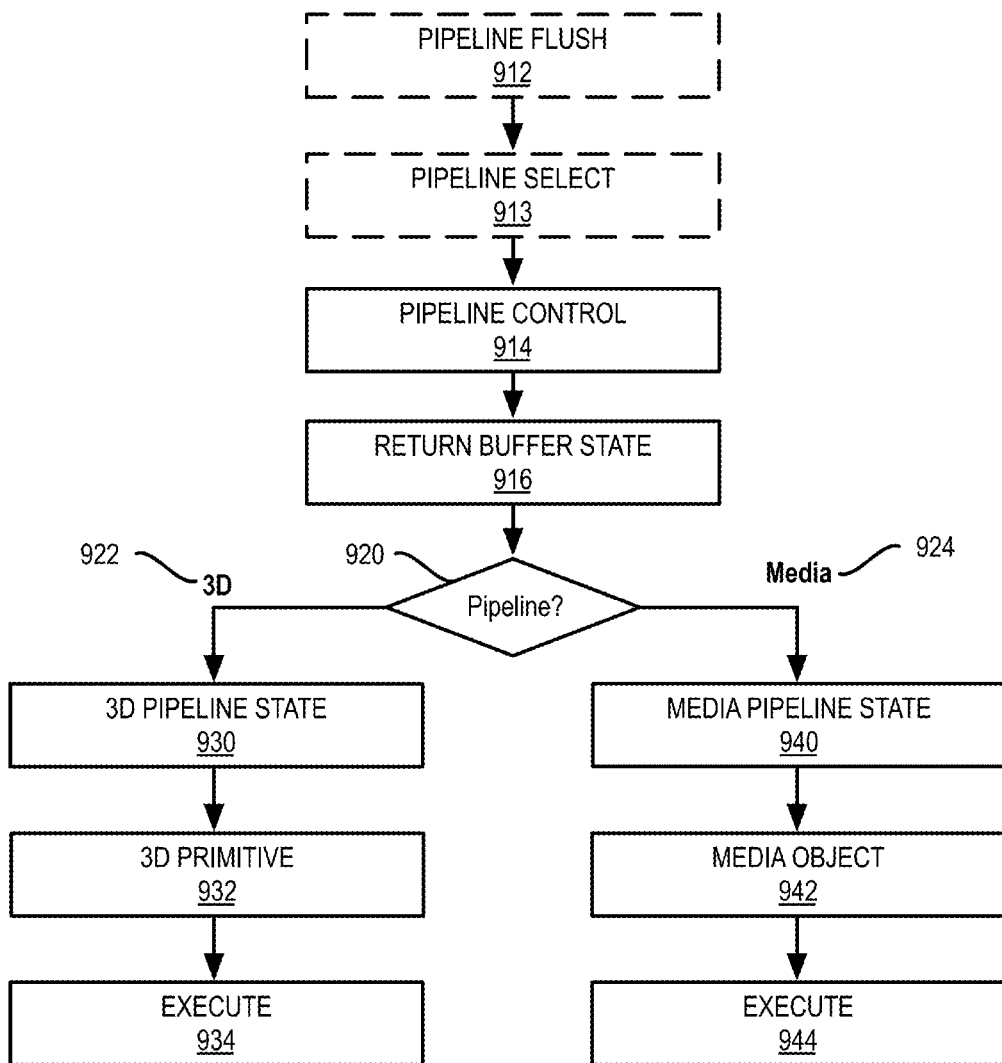

APPARATUS AND METHOD FOR RENDERING ADAPTIVE MESH REFINEMENT (AMR) DATA

BACKGROUND

Field of the Invention

This invention relates generally to the field of computer processors. More particularly, the invention relates to an apparatus and method for rending adaptive mesh refinement (AMR) data.

Description of the Related Art

Adaptive Mesh Refinement (AMR) schemes are increasingly used by various simulation codes to better focus memory and compute resources to areas that matter more than others. This makes it imperative to render them efficiently, but it is not trivial to do so.

There are a variety of different AMR schemes, differing in whether they have structured or unstructured grids; cuboid, hexahedral, or tetrahedral cells; use cell-centered or vertex-centered data points, etc. One of the most widely used such schemes is the Berger-Colella scheme as used in, for example, the Lawrence Berkeley Lab's "Chombo" simulation code.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
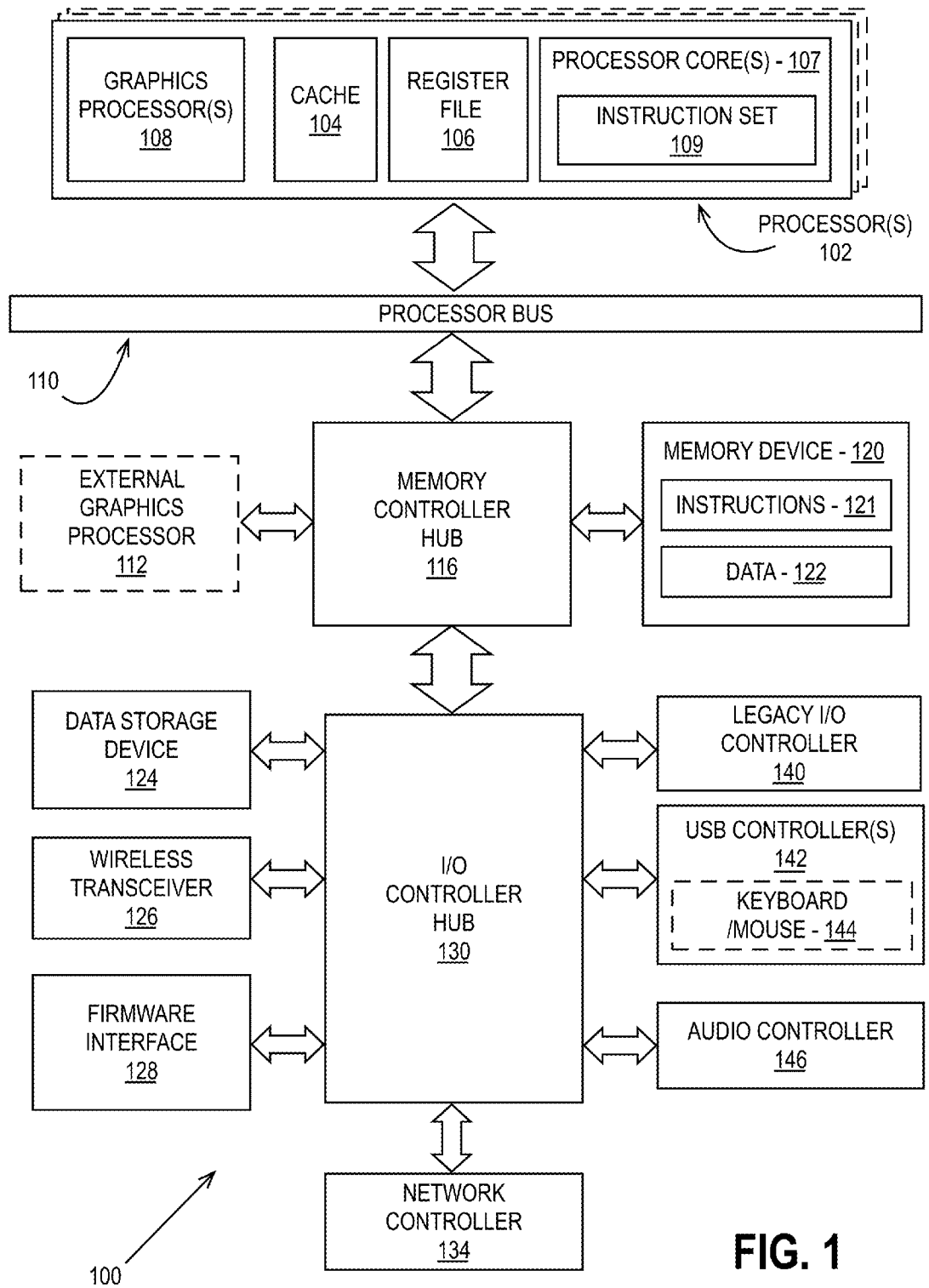
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
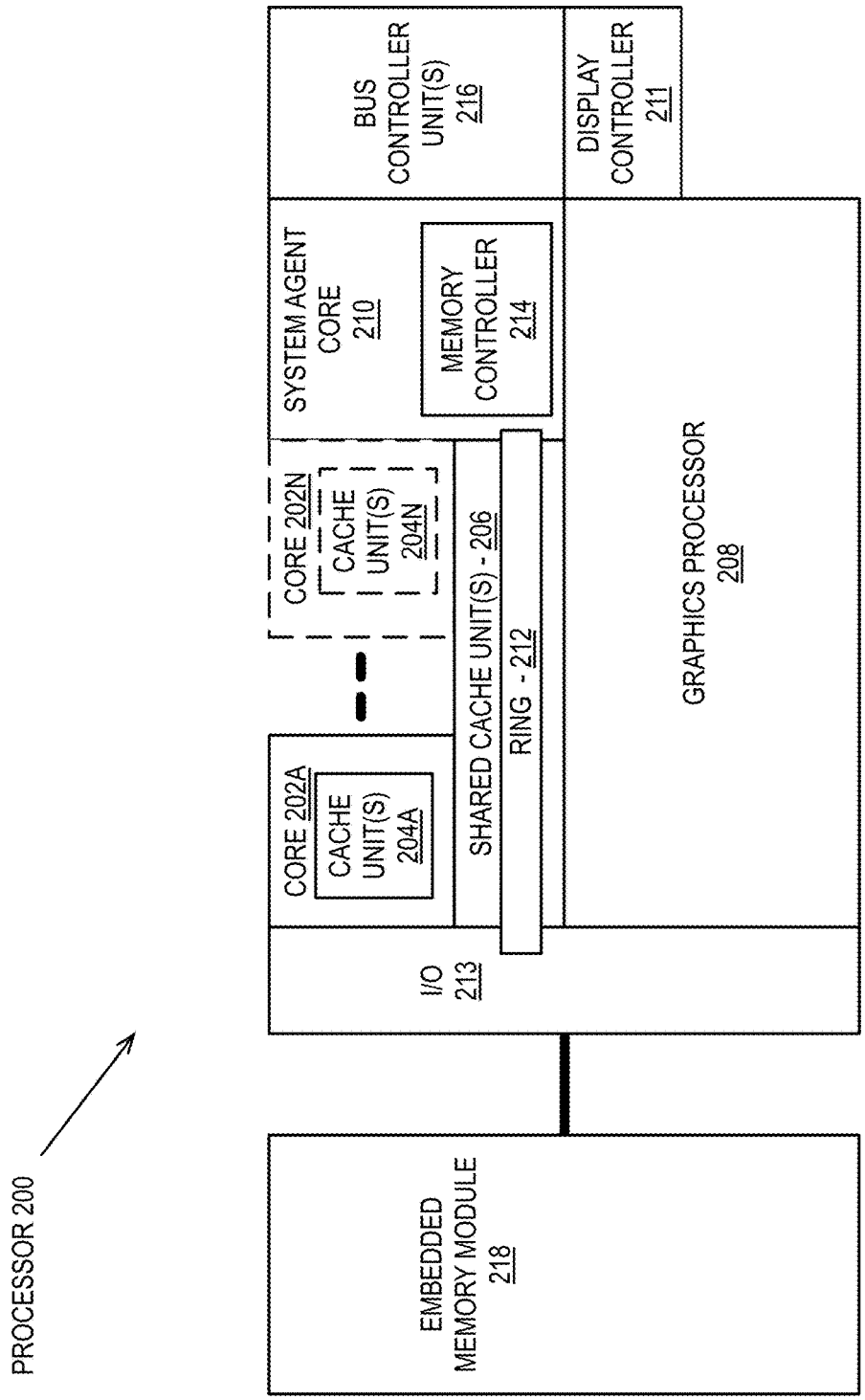
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
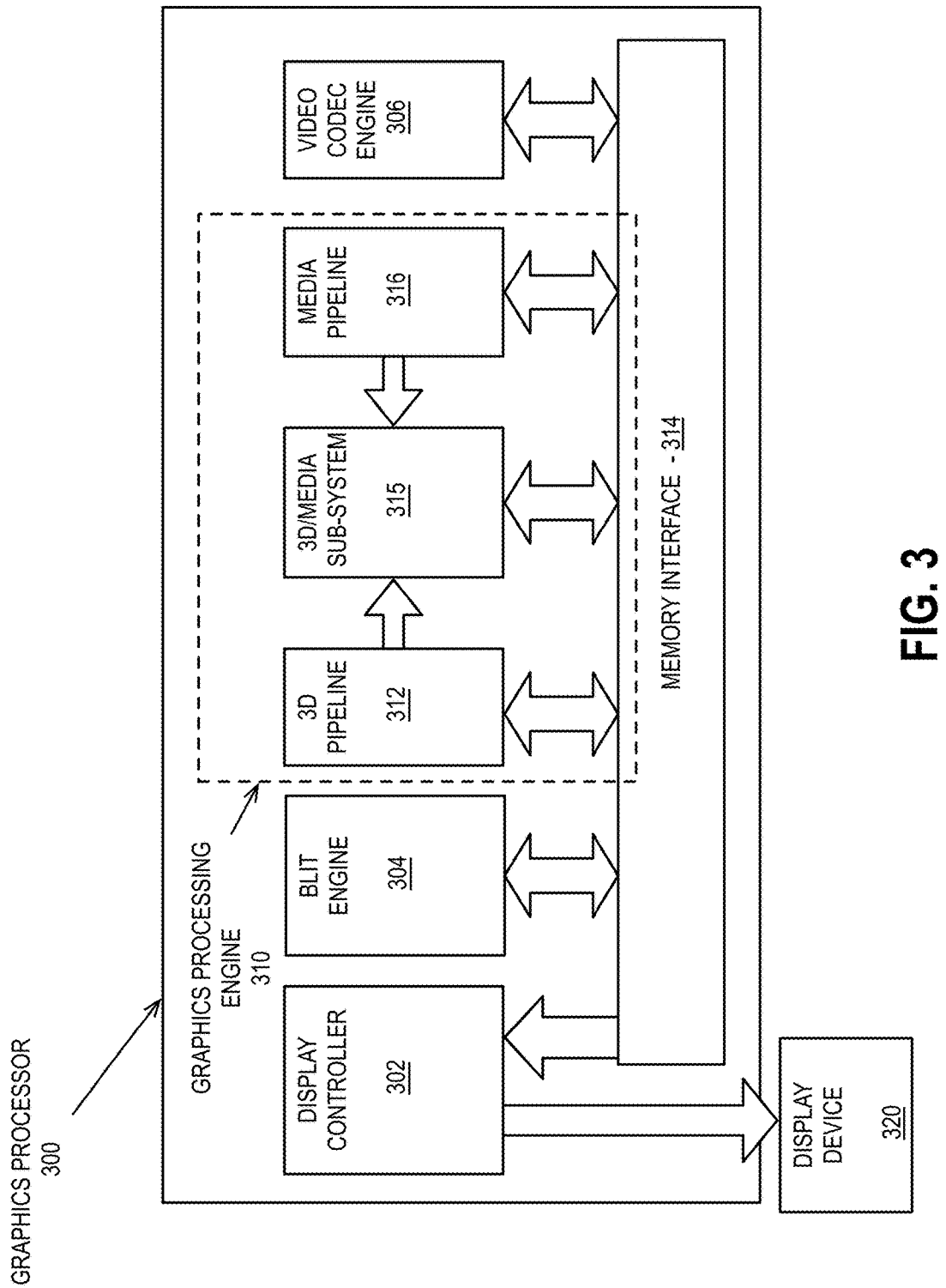
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
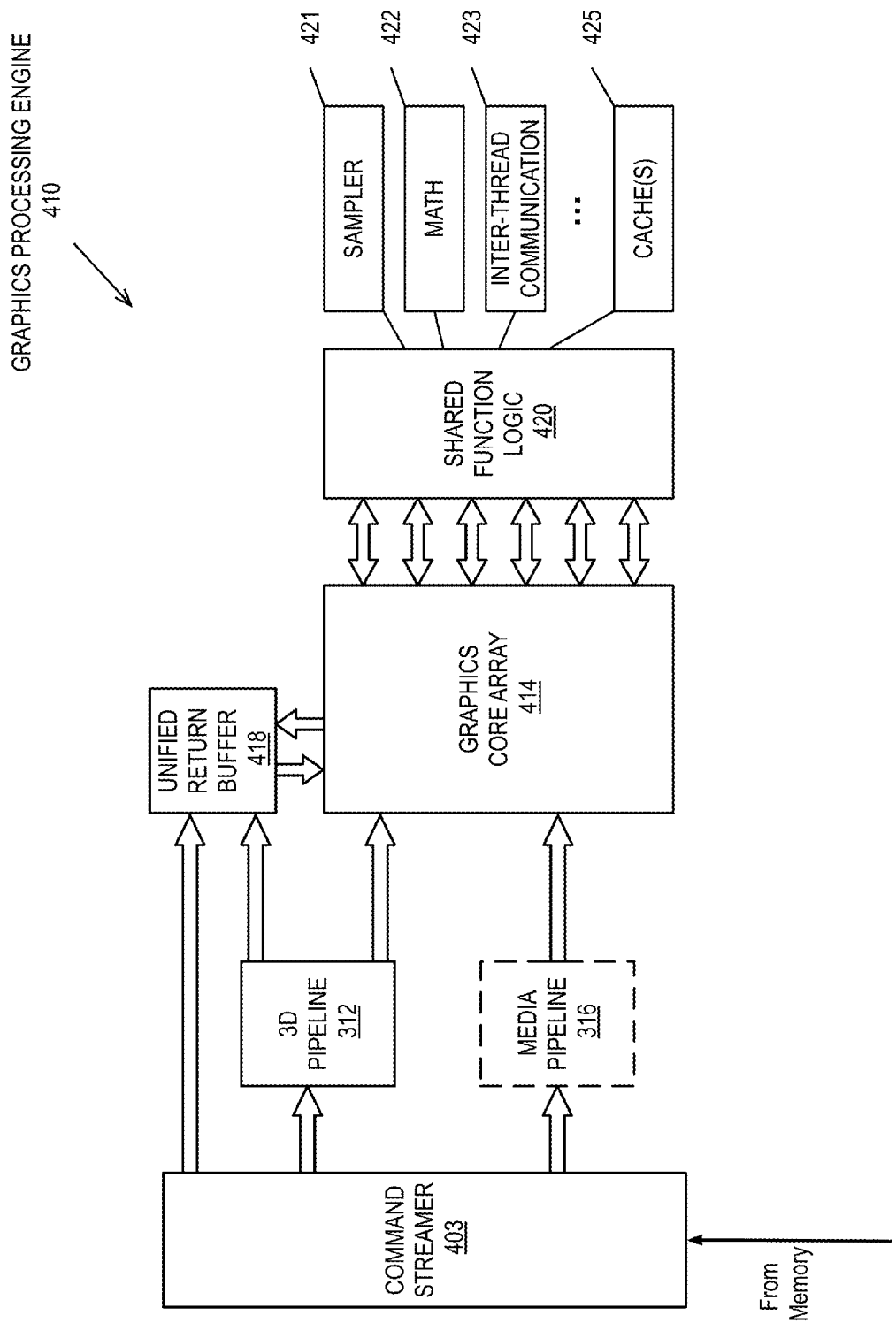
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
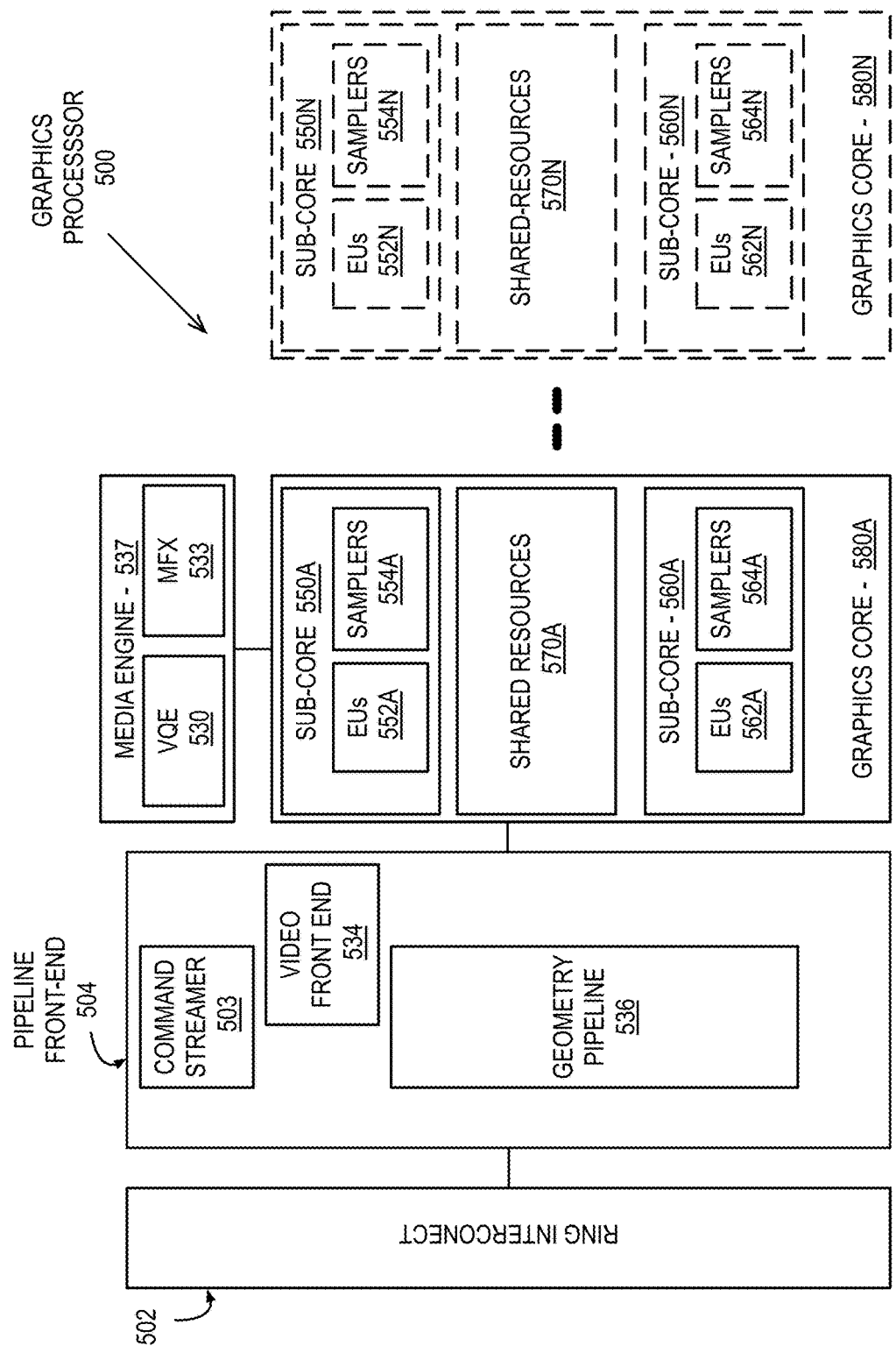
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
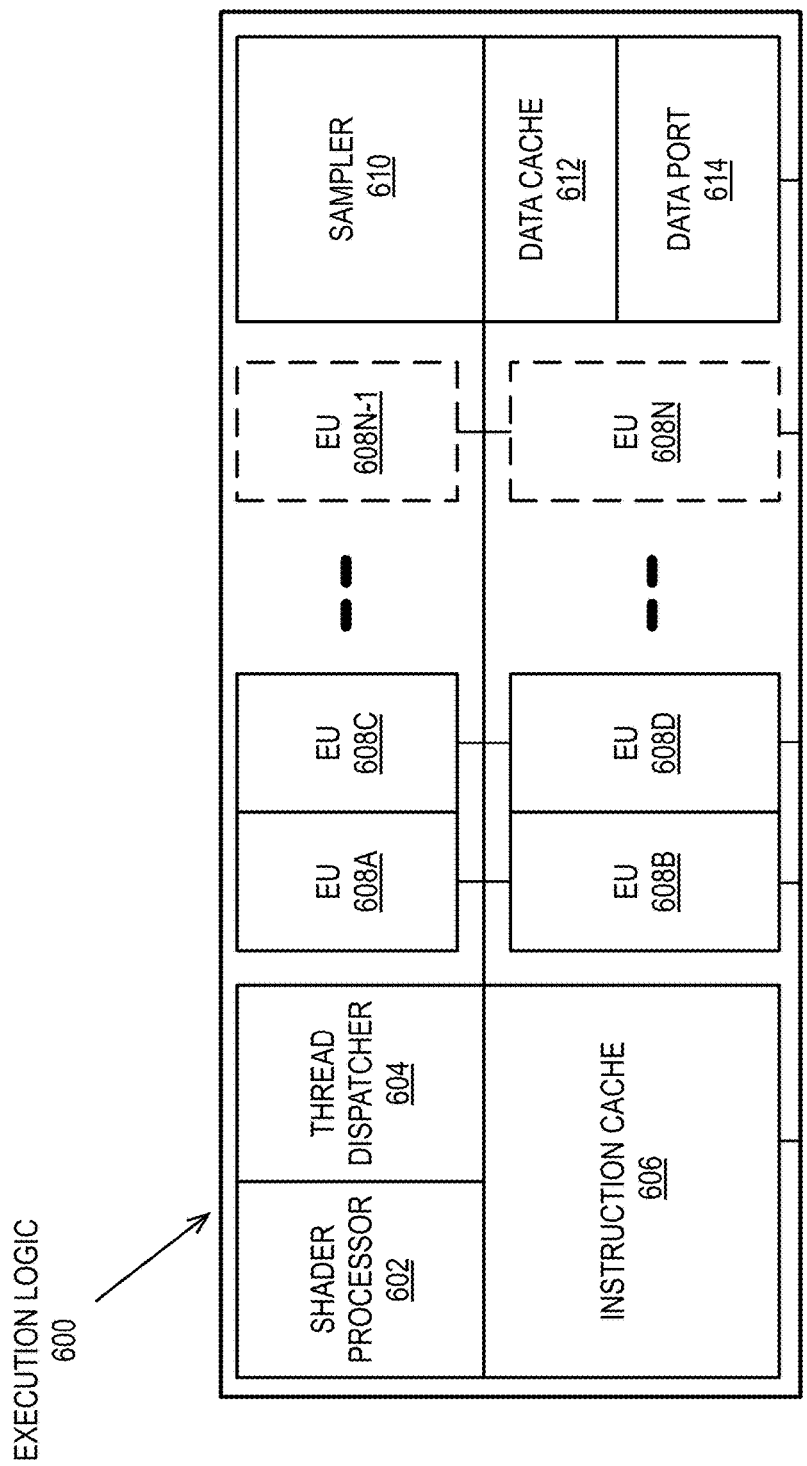
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
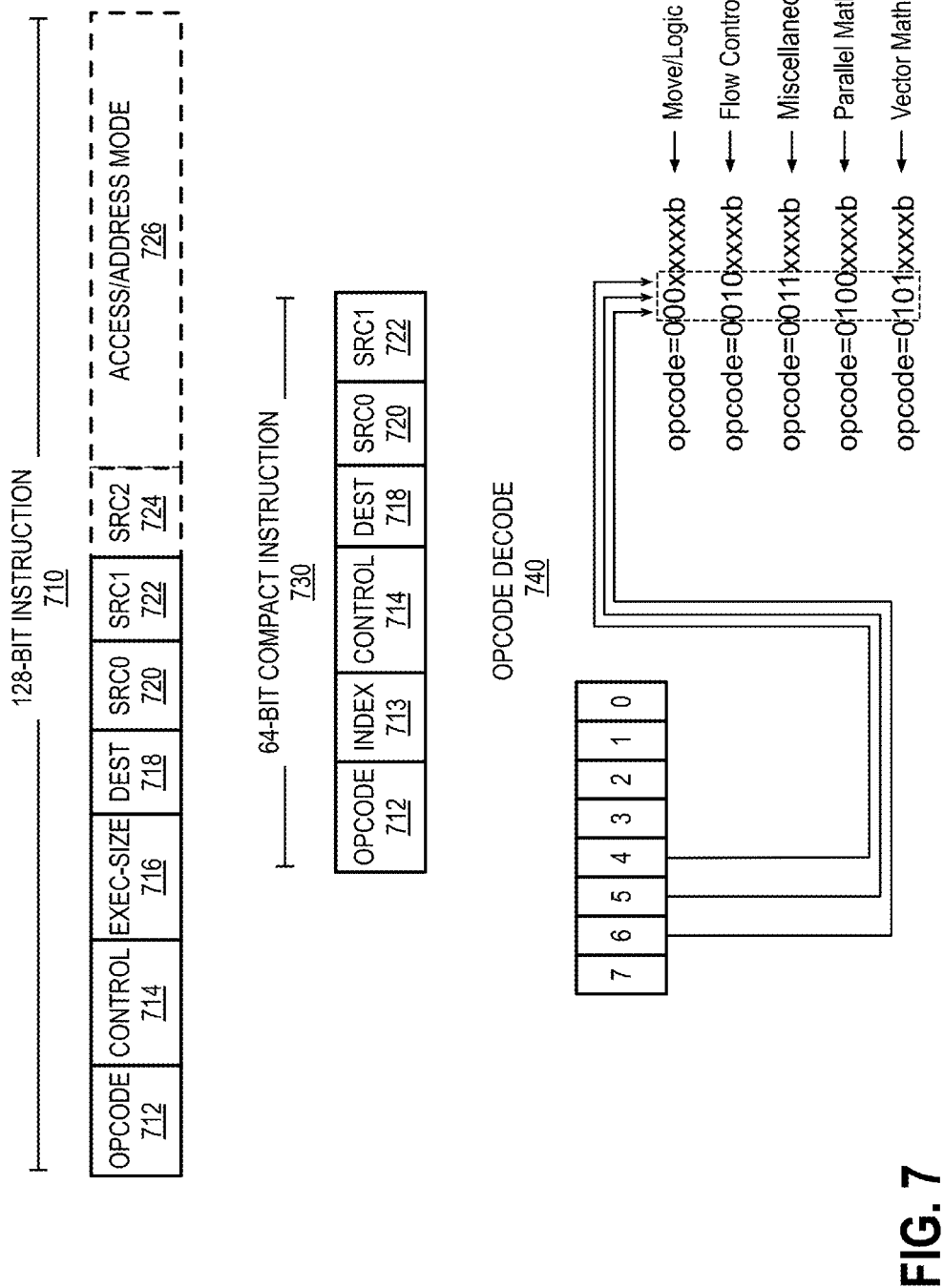
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
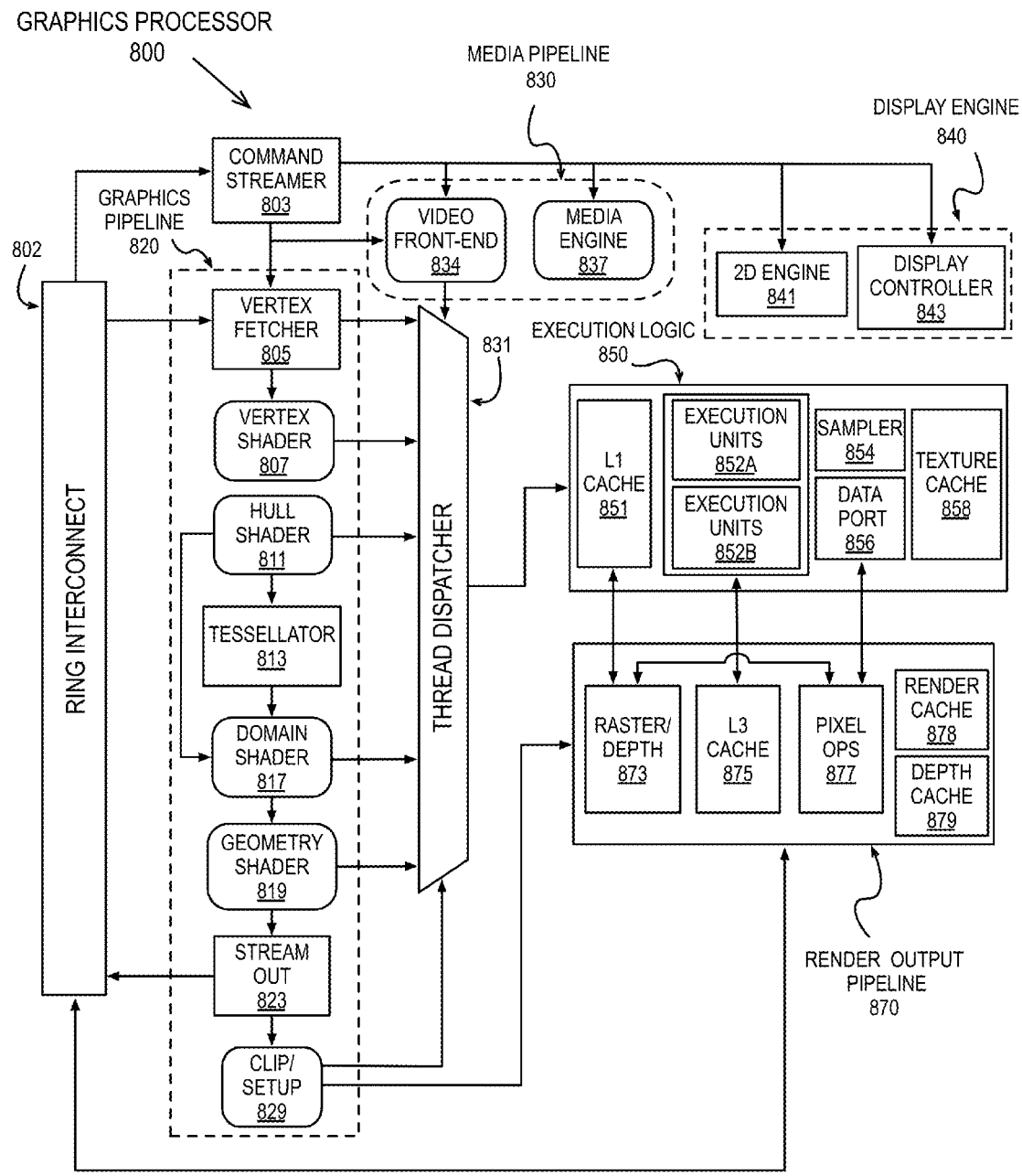
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
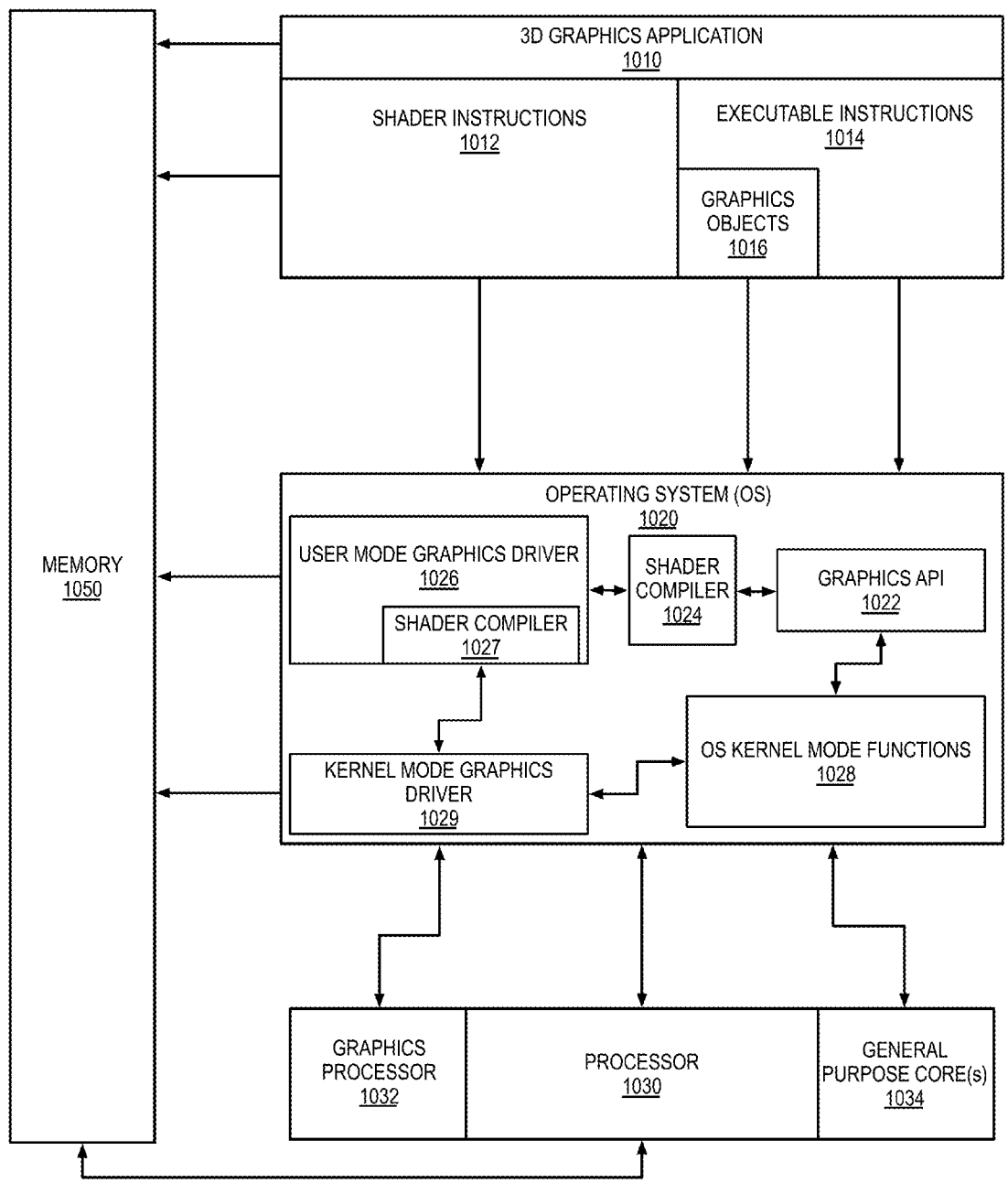
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
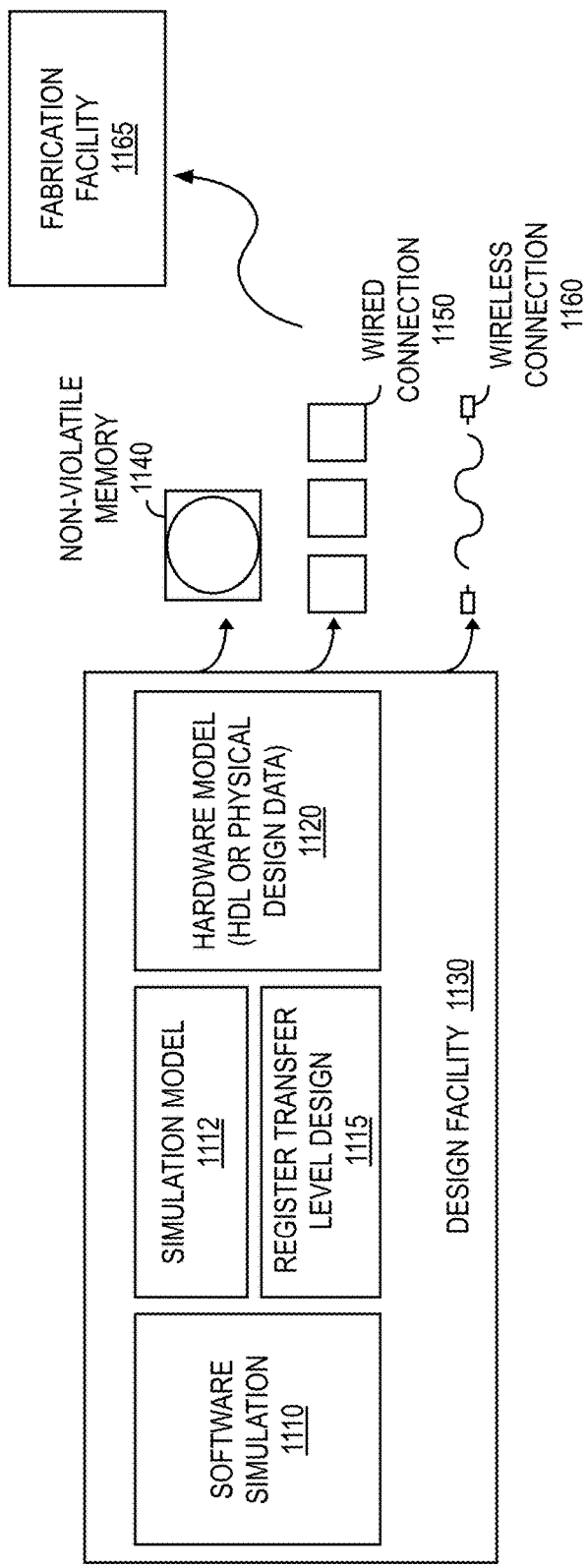
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
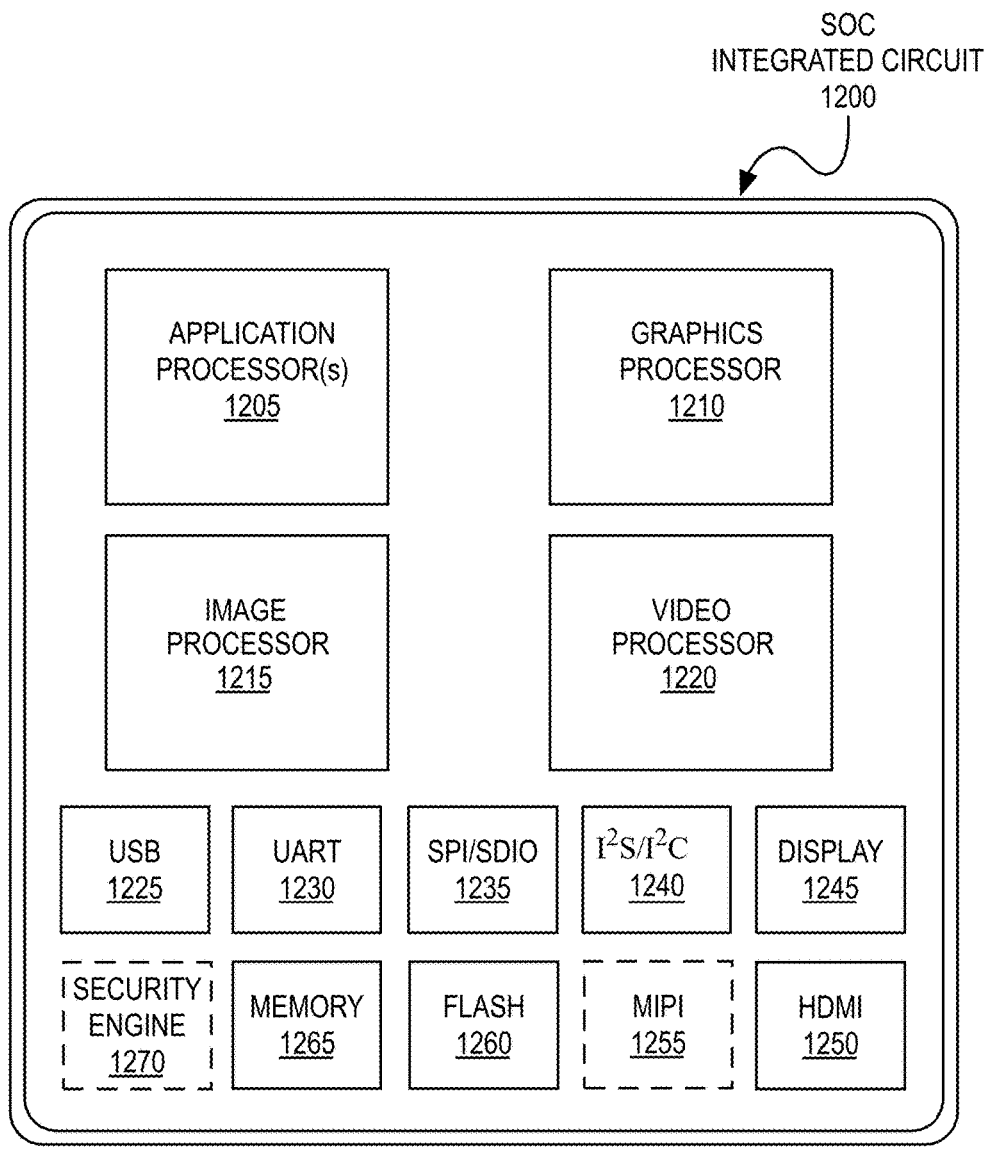
FIG. 12 illustrates an exemplary system on a chip integrated circuit that may be fabricated using one or more IP cores, according to an embodiment.
Figure 13:
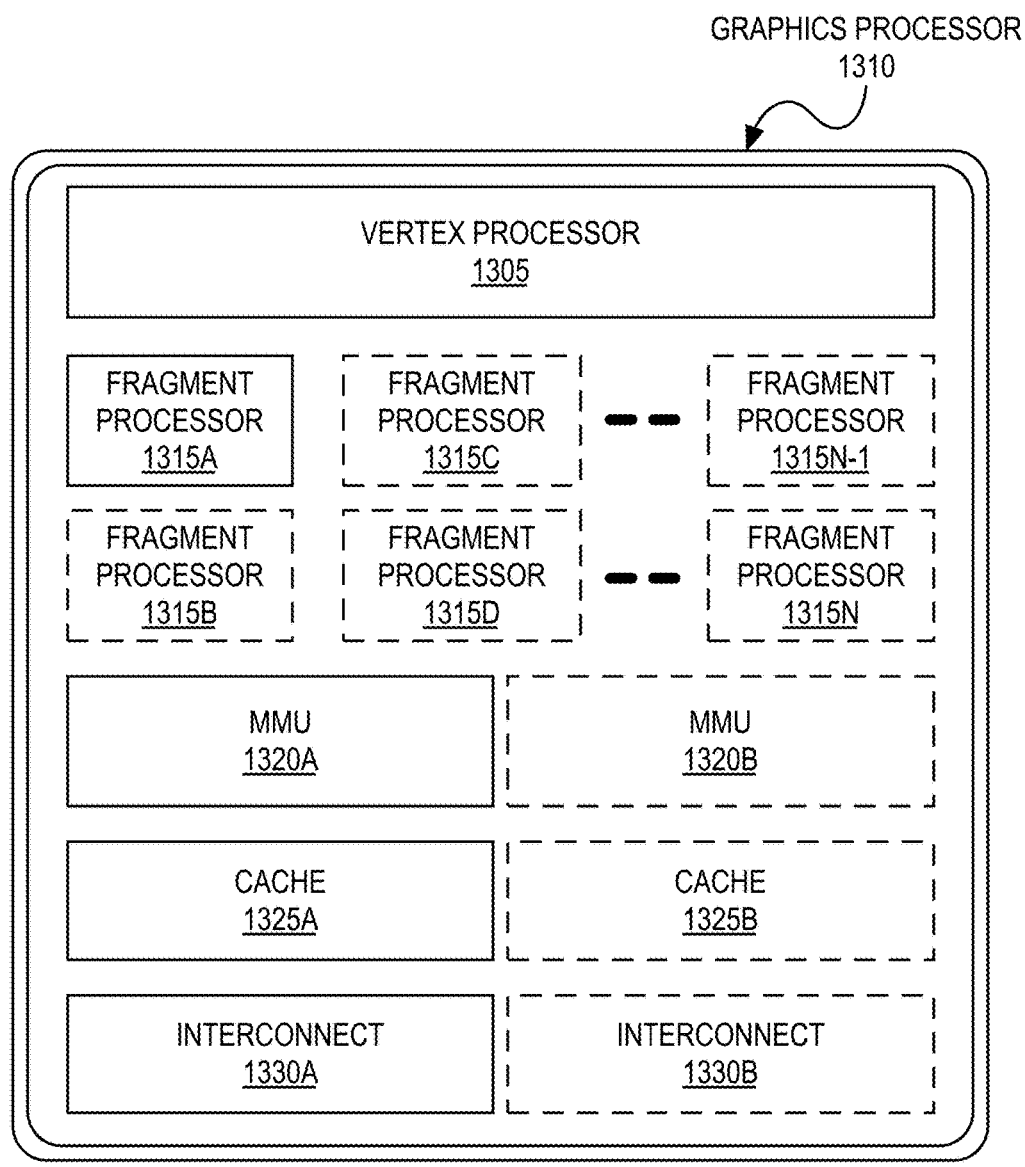
FIG. 13 illustrates an exemplary graphics processor of a system on a chip integrated circuit that may be fabricated using one or more IP cores.
Figure 14:
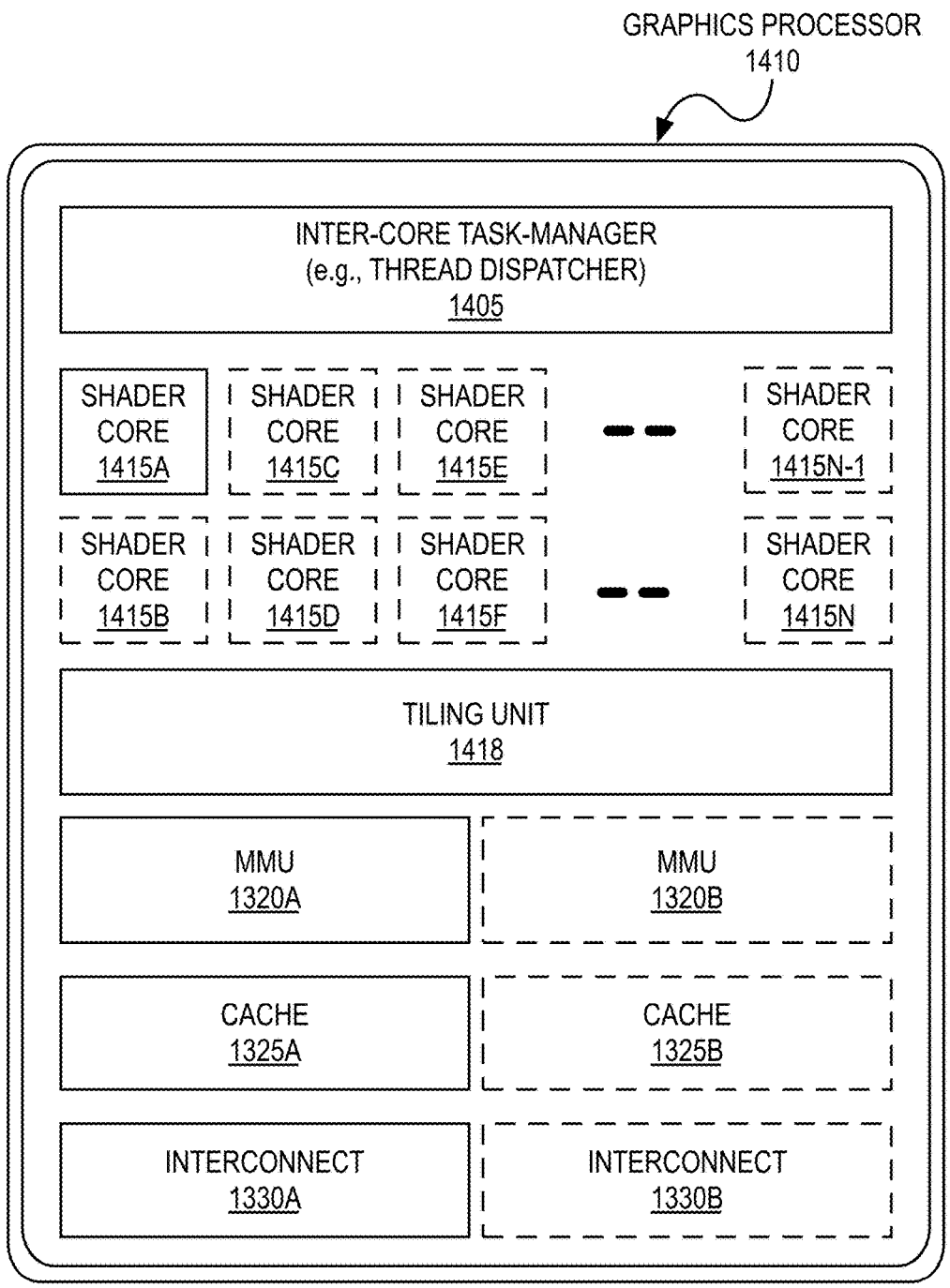
FIG. 14 illustrates an additional exemplary graphics processor of a system on a chip integrated circuit that may be fabricated using one or more IP cores

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Apparatus and Method for Rendering Adaptive Mesh Refinement Data

Figure 15:
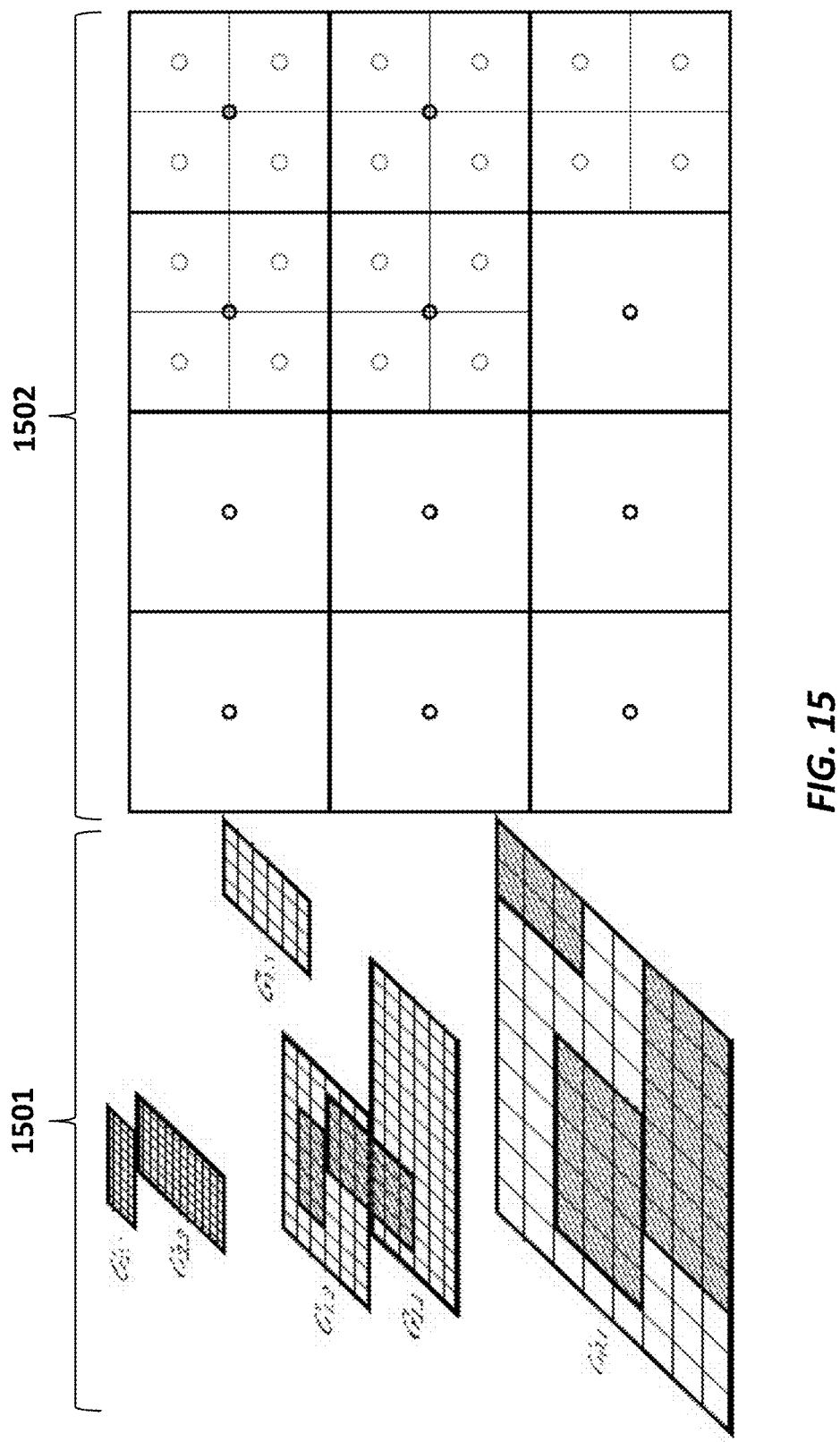
FIG. 15 illustrates exemplary adaptive mesh refinement (AMR) techniques.

As mentioned, one widely used AMR scheme is the Berger-Colella (BC) scheme which is illustrated in FIG. 15. On the left side, 1501, the scheme uses a set of successively finer grids (on a discrete number of levels), where each child level is a constant refinement factor finer than the parent. Grids on finer levels may overlap multiple cells and "overwrite" the coarser levels' cell values (as indicated by the shaded coarser cells in FIG. 15). Finer grids may overlap boundaries of grids on coarser levels, but will always be aligned to cell boundaries; so every cell on a coarse level is either a final leaf cell, or fully refined on a finer level. Data values in BC are specified for the center of each cell. The right area 1502 illustrates a 2D example of the final leaf cells with a refinement factor of 2.

Figure 16A:
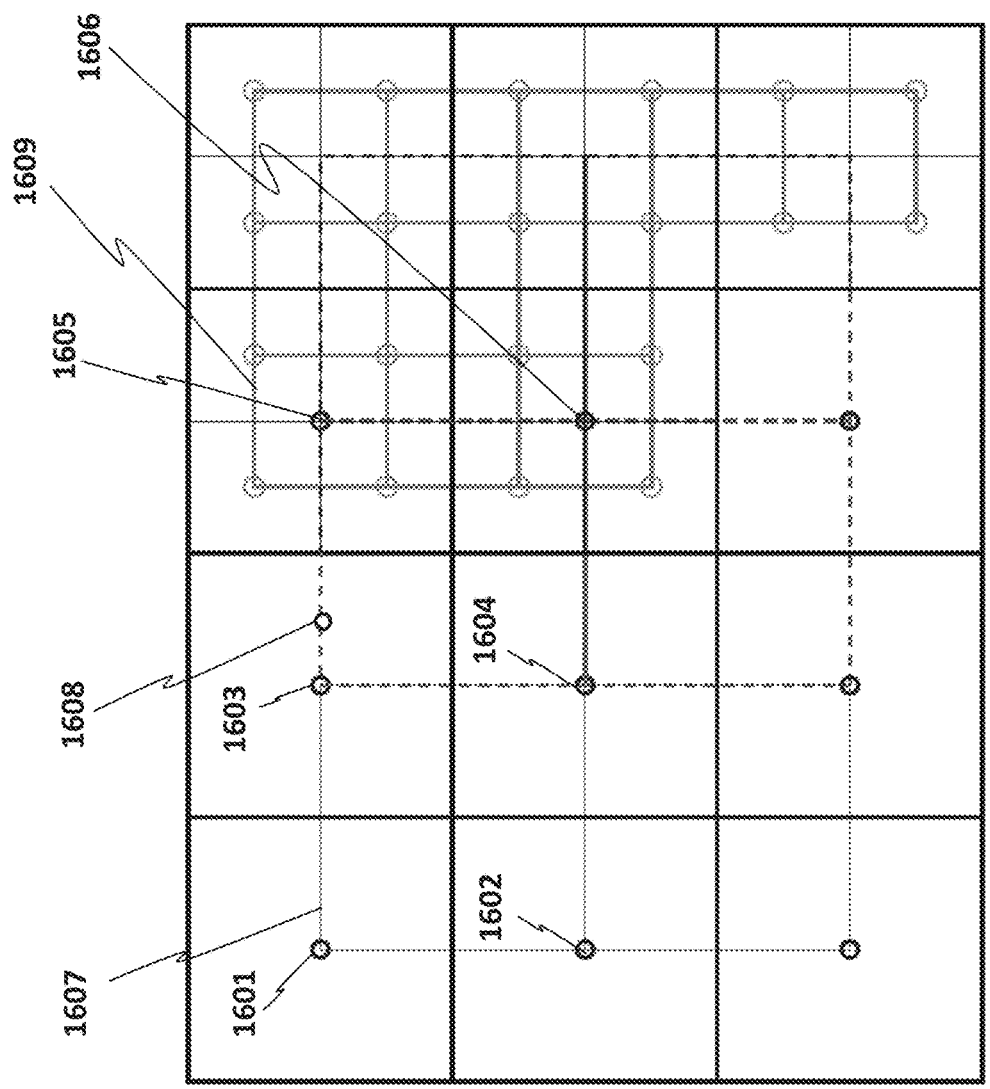
FIG. 16A illustrates an alignment of different AMR cells across different levels.
Figure 16B:
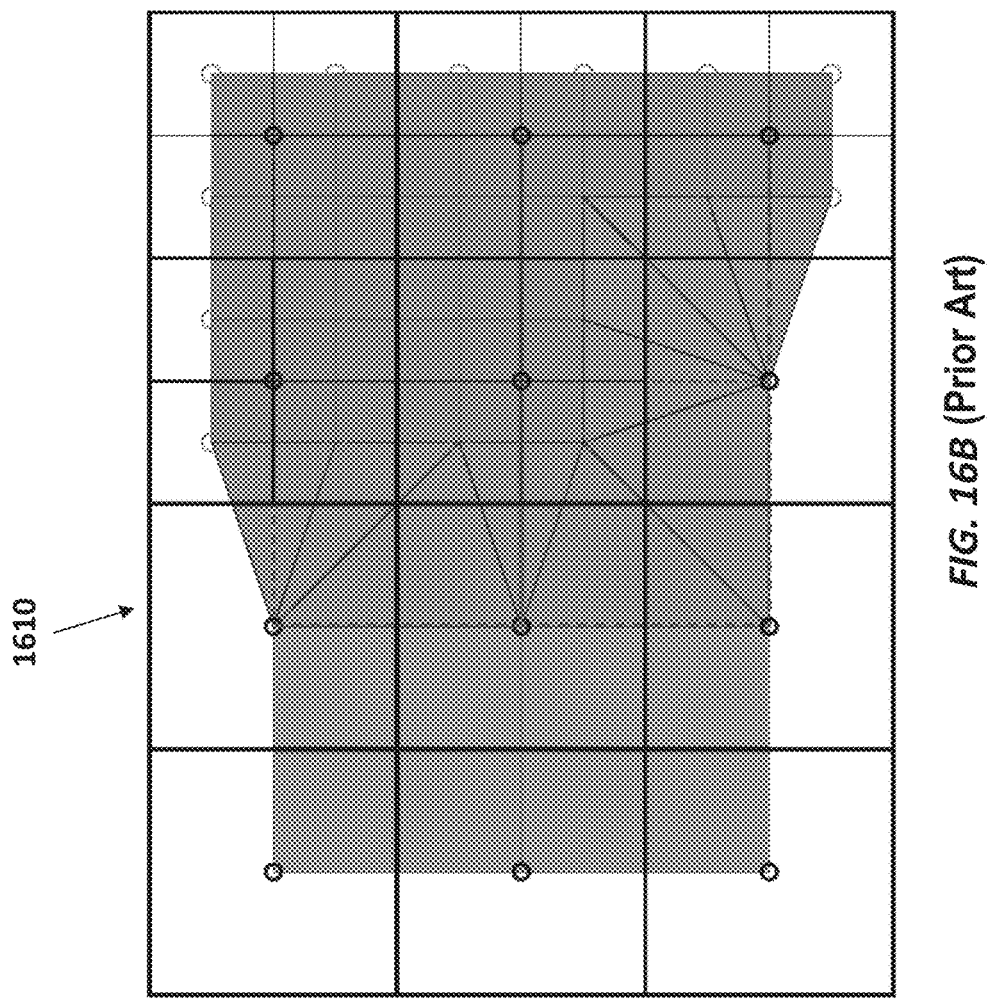
FIG. 16B illustrates a smooth continuous interpolation is through "stitching" across boundaries.

The problem with rendering BC AMR data is that the hierarchical and adaptive structure of the data creates challenges for existing rendering techniques such as volume rendering. In particular, that fact that BC uses cell-centered data means that even though the cells from different levels align perfectly, their respective data points at the cell centers—and thus, the dual grids used for tri-linear interpolation—do not, as illustrated by data points 1601 through 1606 in FIG. 16a. Data points 1601, 1602, 1603, and 1604 are all cell centered data points on the coarse level, and together form a dual cell 1607 which can be used to tri-linearly interpolate between these data points. The area to the right of 1603 and 1604 would be part of a similar dual cell 1608 (spanned by data points 1603 through 1606); however, this dual cell does not align with—and instead partly overlaps—the dual cell 1609 on the finer level side of the level boundary. In particular, in BC-AMR, cells align across levels, but their cell centers—and thus, the dual grids used for interpolation do not. This makes it tricky to create a smooth interpolant that is easy to evaluate. FIG. 16b illustrates a smooth continuous interpolation achieved through "stitching" across boundaries using tets, but is tricky and costly. That is, in entirely coarse regions one can do a simple trilinear interpolation on the "dual" grid spanned by the cell centers on the coarse grid; in regions that lie entirely within finely represented regions one can do the same on the fine regions, but at the boundaries this is not easily possible.

Note that other types of AMR data—in particular, vertex-centered schemes—can be more easily rendered using techniques such as the one by [Verdiere et al] (See References below). BC, however, is still challenging. There are four well known approaches to rendering AMR data:

Resampling the data to a structured regular grid, and rendering this. This makes rendering trivial, but typically leads to loss of data. Simulations use AMR exactly because representation at the finest level is infeasible for any but the most trivial examples, so resampling for rendering typically has to rely on subsampled representations.

Nearest-neighbor reconstruction: Rather than interpolating between "neighboring" data points one simply picks the value of the cell that the data point lies in. This however creates undesired "artifacts" in particular for "spiky" transfer functions. Even in coarse regions the reconstructed scalar field does not vary smoothly between neighboring samples, but "jumps" at cell boundaries.

Grid homogenization and compositing [Kreylos et al], works by partitioning the domain into non-overlapping regions with same refinement level, rendering those individually, and compositing them together. This does however not ensure smooth interpolation across grid boundaries. In fact, the paper seems to use a cell projection scheme.

Interpolating with tet-stitching as proposed by [Weber et al]. In this case neighboring cells from different refinement levels are connected through tetrahedral shapes and/or pyramids, inside of which one performs linear interpolation, as shown in FIG. 16B. The problem with this approach is that it requires generation of these tetrahedral shapes (which in itself is not trivial), and then requires finding those during sampling, which is costly.

I. Overview

One embodiment of the invention includes one or more of the following four components:

a) A "multi-octree" data structure or a kd-tree data structure that generalizes the type of data used in BC-AMR, and makes it easier to reason about things like neighbors, parents, children, etc., of a given cell.

b) A set of interpolation schemes based on this data structure c) A specific interpolation schemes based on this data structure that is both smooth and continuous, and that relies on repeated trilinear interpolation d) A ray tracing-based rendering approach that uses this interpolation scheme to render BC-AMR data.

One embodiment of the invention relies on the following key kernels which may be executed, regardless of the type of data structure used (e.g., kd-tree or multi-octree):

a) Find the "closest existing cell" (as defined below) for a given 3D position P and level L; and return the parameters that describe this cell (e.g., its coordinates, level, center, and/or value);

b) Find the closest existing leaf cell for a position P;

c) Find the closest existing leaf cell for a given set of logical cell coordinates (i,j,k,l);

d) Given six coordinates x0,x1,y0,y1,z0,z1 and a level L; find the eight closest existing cells for the 8 points (x0,y0,z0), (x1,y0,z0), . . . etc, on level L; and e) Given a logical dual cell coordinate (i,j,k;l), find the eight closest existing cells for that dual cell (ie, cells (i,j,k;l), (i+1,j,k;l), (i,j+1,k;l), . . . etc).

Depending on the implementation, these operations may be implemented either in a kd-tree, or with the multi-octree as described in detail below.

Terminology

The following terminology is used throughout this application:

Logical Nested Grid Space:

In order to abstract from the actual input data layout (individual bricks on different levels) cells are referred to in logical nested grid space. The AMR data can be viewed as a succession of levels $L^{(l)}(l=0 \ldots \text{maxLevel})$, where each level is logically a structured grid of $N_x^{(l)} \times N_y^{(l)} \times N_z^{(l)}$ logical cells $C_{i,j,k}^{(l)}$, with the sole caveat that some of these cells actually exist in a given BC data set, and some do not. Those logical cells that map to actual input data points are referred to as actual cells, while those that do not as virtual cells. Each cell C has a center $C_P$, a level $C_l$, etc; actual cells also have a data value $C_v$, while virtual ones do not.

This grid can also be logically extended to infinity by simply considering all cells outside the root level's bounding box as virtual. For any level l and 3D point P an operator $C^{(l)}(P)$ is defined that maps P to the logical cell that P lies in.

Closest Existing Cell:

For each logical cell C a definition is used for the closest existing cell (CEC) $\hat{C}$ of C: if C is an actual cell, its CEC is just that; if it is not, $\hat{C}$ is defined as the actual leaf cell that C.p lies in. Since this makes sense only for cells that lie in the bounding box of the input data we assume that this CEC-operator will, for any P outside this bounding box, first move P to its respectively closest position inside the domain.

Similarly we can define, for any 3D position P, the closest existing level-l cell $\hat{C}^{(l)}(P)$ (as the CEC of $C^l(P)$); and the closest existing leaf (CEL) $\hat{C}(P)$.

Dual Cell:

Using logical grid terminology allowed for more straightforward reasoning about logical cells $C_{i,j,k}^{(l)}$. In a similar fashion, logical dual cells $D_{i,j,k}^{(l)}$ (spanned by $C_{i,j,k}^{(l)}$ and $C_{i+1,j+k,k+1}^{(l)}$) may also be considered. Again as was done for cells, it is assumed that there is a kernel $D^{(l)}(P)$ that computes the coordinates of the dual cell, as well as the CEC of each of its 8 corner vertices. For each of these corners its logical coordinates C may be accessed as well as actual coordinates (and value) of its CEC, $\hat{C}$. This allow for determining which of the corners C actually exists (C=$\hat{C}$), and which ones are virtual (C≠$\hat{C}$). It is perfectly valid for the dual cell to lie partly or entirely outside the bounding box; and/or for some (or even all) of the corners to map to exactly the same CEC.

Cell Location:

In all our methods it is assumed that it is possible to efficiently query cells, dual cells, etc. In particular, in our pseudo-codes we assume a kernel findLeaf(P) that finds the CEL of P, a findCell(l,P) that finds the CEC $C^{(l)}(P)$, a findDual(l,P) that finds the level-l dual cell (and the CECs of its corners), and a D.lerp(P) that computes tri-linear interpolation inside D. Ways of realizing these kernels will be discussed below.

II. Cell Based Reconstruction Techniques

Similar to nearest-neighbor filtering for textures or structured data, one way to perform reconstruction is to look up the leaf cell containing the query point, and return its value:

```
float nearest(P)
    C = findLeaf(P)
    return C.v
```

This method is fast and simple, but not continuous even in same-level regions, which very much limits its usefulness.

Single-Level Interpolation

Thanks the logical grid abstraction each specific level can be viewed as a structured grid, with values for non-existing cells defined through the CEC operator. In particular, this allows for picking any logical level l, and tri-linearly interpolating on it:

```
float lerpOnLevel(l,P)
    D = findDual(l,P)
    return D.lerp(P)
```

This is cheap and continuous, but not adaptive. To make it such, we can pick the level based on the sample's leaf level:

```
float leafLevelLerp(P)
    C = findLeafCell(p)
    return lerpOnLevel(C.l,P)
```

This method is no longer continuous across level boundaries, but otherwise already quite useful: it is adaptive, locally trilinear, simple, and still rather fast. In particular, in all regions except boundaries it is the same as tri-linear interpolation on that given region's refinement level.

Blending Between Levels

The cause of the previous method's discontinuities is that while each level's interpolant was continuous, the method we used for selecting the level was not. One way of fixing this is to smoothly blend between levels. In particular, virtual cells can be viewed as transparent, and actual ones as opaque. Once this is done, opacities of 1 and 0 can be assigned to the centers of actual respectively virtual cells, and we can then trilinearly interpolate between these. This yields a continuous blending function that can be used to blend between any level l and the coarser ones below:

```
float blendNaive(P)
    float f = 0.f;
    for (level=0,1,...MAXLEVEL)
        (f_l,a_l) = lerpOnLevel(l,P)
        if (a_l == 0) break
        f = a_l*f_l+(1-_l)*f
    return f
```

In homogeneous regions, this method is the same as tri-linear interpolating on that level; across boundaries it smoothly blends between the adjoining regions' interpolants. This method is thus adaptive and continuous; and (though less obviously so) interpolating.

Though these are nice properties to have, as just explained this method would be expensive, as it would have to perform a dual-cell look-up on every level. In practice, however, very few levels will contribute to any point $\vec{X}$: many fine levels will be completely transparent at $\vec{X}$:, and everything below a completely opaque level would be weighted by 0. This suggests an optimization where we either start at the coarsest level and blend "upwards" until we reach a completely transparent level (at which point no finer levels can contribute); or where we start at the finest one and blend "downwards" until we reach a completely opaque one. Even more interestingly, we can start at the leaf level of $\vec{X}$:, and then blend both upwards and downwards until the finest and coarsest contributing levels have been found. This can lead to significant performance gains over the naïve blending, and is what we will be using in our evaluation:

```
float blendFast(P)
    // find leaf level, and lerp
    C = findLeafCell(P)
    D = findDualCell(C.l,P)
    f = D.lerp( )
    // blend towards finer
    D' = D
    for (l = C.l+1 ... MAXLEVEL)
        if (all vertices of D' are leaves) break
        D' = findDualCell(l,P)
        (f_l,a_l) = D'.lerp(P)
        f = a_l*f_l + (1-a_l)*f
    // blend towards coarser
    if (any vertices in D are virtual) {
        a = D.lerpAlpha(P)
        f = f*a
        for (l = C.l-1 ... 0)
            D' = findDualCell(l,P)
            f += (1-a) * D'.lerp(P)
            if (all vertices in D' exist) break
            a += (1-a)*D'.lerpAlpha(P)
    // done
    return f;
```

Reconstruction Via Basis Functions

The blend method is both adaptive and continuous (i.e., crack-free)—but can lead to an artifact sometimes referred to as ghosting. The root of the problem is that in those areas where the blend function blends across a level boundary, this blending involves cells whose contributions are questionable. On the fine level some cells are virtual and filled by closest existing cells; and on the coarse level some cells will be inner cells whose values should actually be superseded by their finer level refinements. Obviously this could be avoided only by methods that only use actual leaf values.

Though often seen as a form of "blending" between extremal values, regular tri-linear interpolation can also be viewed as the sum of 8 hat-shaped basis functions located at the dual cell's corners:

$$lerp(\vec{p}, D) = \sum_{C \in corners(D)} \hat{H}_C(\vec{p}) C_v,$$

using the hat-shaped basis functions $$\hat{H}_C(\vec{p}) = \max\left(1 - \frac{|\vec{C} \cdot p - \vec{p}|}{C \cdot w}, 0\right)$$

For each cell C this basis function would be centered at $C_P$ and have a support width of $\pm C_W\bullet$, where $C_W$ is the width of cell C.

Borrowing some concepts from scattered data interpolation techniques (see, e.g., [FN80]) we may now view our AMR data points as a sort of scattered data points $(C_i)^N_{i=0}$ with basis functions $\hat{C}$, and—using Franke-style scattered data interpolation—can reconstruct any point using a weighted and re-normalized sum of those basis functions:

$$AMR_{hats}(\vec{p}) = \frac{\sum_{c_i} H_{c_i}(\vec{p}) c_i \cdot v}{\sum_{c_i} H_{c_i}(\vec{p})}.$$

Though Franke's scattered-data interpolation method does not specify which basis functions to use (and is often used with Gaussian or other basis function), our choice of $\hat{H}_c$ is deliberate: they are easy to compute, and in most regions will automatically yield exactly the same interpolant as tri-linear interpolation. Around boundaries the superposition of basis functions results from different levels, which will smoothly blend between levels; and as virtual or inner cells are not used ghosting is significantly reduced.

For any point P, computing this interpolant requires finding all leaf cells C that have non-zero contribution at P. For our choice of basis function, on each level L only the eight corners of P's dual cell can possibly contribute, leading to a very simple implementation:

```
float AMR_hats(P) =
    float sum_weights = 0
    float sum_weightedValues = 0
    for (l = 0 ...)
        D=findDualCell(P)
        foreach corner cell C of D
            if (C is a leaf cell)
                sum_weights += H_hat(P,C)
                sum_weightedValues += H_hat(P,C)*C.v
        if (none of the C in D are inner nodes)
            break
    return sum_weightedValues / sum_weights
```

On the upside, this interpolant is easy to implement, smooth, continuous, and produces good image quality. On the downside, it is no longer interpolating, and also it is no longer obvious how to do implicit ray-isosurface intersection. In terms of performance, the finest level that contributes can be determined, but a good way of knowing the coarsest one that does is not known; this means that in deeply refined regions many dual-cell look-ups have to potentially be performed, which is costly.

Exemplary Architectures

Figure 17A:
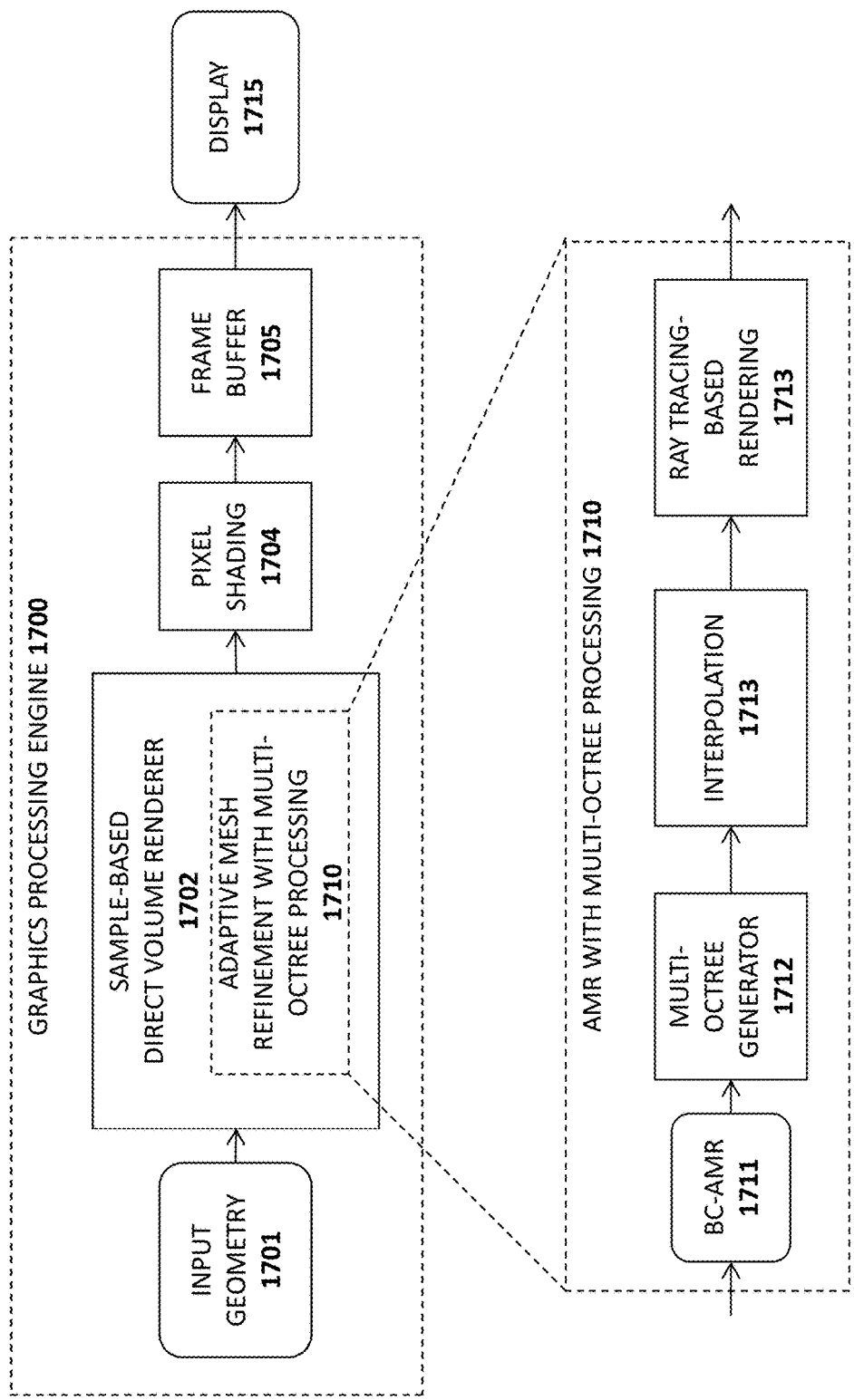
FIGS. 17A-B illustrate exemplary graphics processing engines in accordance with embodiments of the invention.
Figure 17B:
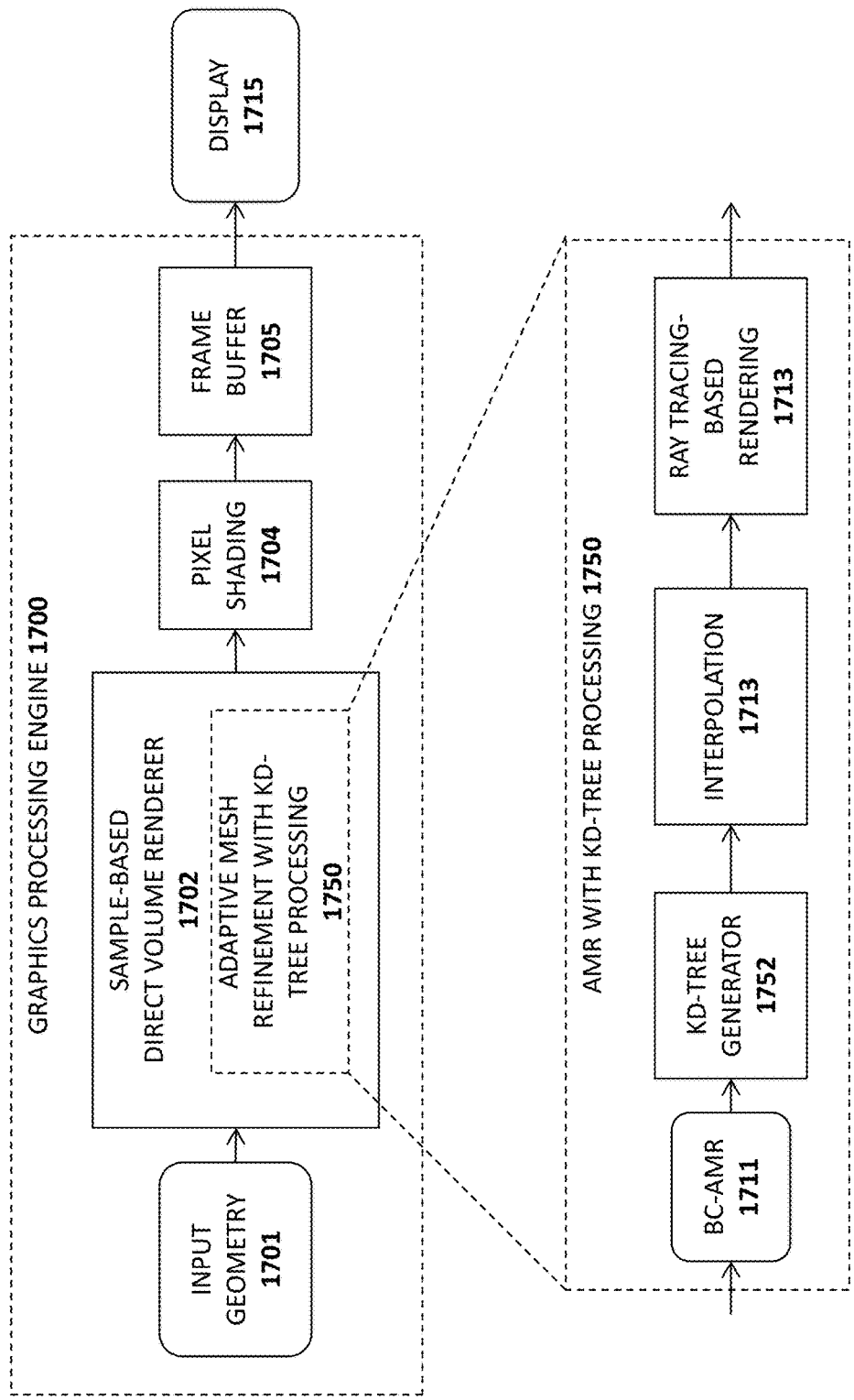

FIGS. 17A and 17B illustrate an exemplary graphics processing engine 1700 on which embodiments of the invention may be implemented. In particular, in FIG. 17A, a sample-based direct volume renderer 1702 includes adaptive mesh refinement (AMR) with multi-octree processing logic 1710 for performing the AMR techniques described herein using input geometry 1701. FIG. 17B illustrates another embodiment which includes adaptive mesh refinement with KD-processing logic 1750. A description of the embodiment in FIG. 17A which uses a multi-octree data structure is provided in Section II and a description of the embodiment in FIG. 17B is provided in Section III.

III. Octant Based Reconstruction Techniques

One embodiment of the invention takes advantage of the fact that every cell can be viewed as consisting of 8 octants (i.e., 4 quadrants in 2D), and that when doing so, every quadrant is always on exactly one level, and never overlaps any level boundaries, nor other cells' octants. For example, as shown in FIG. 16b, every quadrant of any cell is either completely green, blue, or red; never both. In addition, in one embodiment, the "new" data points at the corners of these quadrants are used in a way to create an interpolant that is both smooth and continuous (see below).

One embodiment of the invention does not consider either cells or dual cells of the original grids, but instead looks at the octants of the input cells. The problem with interpolation across level boundaries is that cells align, but cell centers— and thus, dual cells, do not. Octants, however, lie at the intersection of cells and dual cells, as illustrated in FIG. 18A, and do align at level boundaries. At these level boundaries the frequency of octants on the fine and coarse sides of this boundary varies, but coarse ones align to fine ones. Furthermore, the vertices of these (implicit) octants at cell boundaries are free to be chosen, allowing the construction of an interpolant in a way that is continuous at the cell boundaries (even those from different levels), while still interpolating the original data points (that always lie within the cells).

Using this observation, one embodiment of the AMR with multi-octree processing logic 1710 and/or AMR with KD tree processing logic 1750 identifies octants, trilinearly interpolates inside these octants, and properly chooses the interpolation values at the corners of these octants (C,Vx,Vy, etc, in FIG. 18B) to create the proper interpolant. These values can be properly chosen, and can be computed efficiently via linear, bilinear, or trilinear interpolation from neighboring cell values.

Smooth Interpolation of BC-AMR Using Repeated Linear Interpolation

In one embodiment of the invention, the interpolation scheme for a point P=(Px,Py,Pz) proceeds as follows (consult FIGS. 18A-B for the naming scheme used):

1) Find the leaf cell L=(Li, Lj, Lk)(Lm) for P as described above.

2) Determine the octant of L that P lies in. This defines 7 new (virtual) data points Vx,Vy,Vz, etc, that coincide with the leaf's boundaries (see FIGS. 18A-B).

3) Compute the index of (logical) face neighbor Cx in the x direction, and locate the closest node for that index. If that cell existed on L's level, determine Vx through interpolation: Vx=avg(V,Cx), where avg(X,Y) refers to the average of the values stored at cells X and Y. If this node did not exist on this level (i.e., Cx.l<L.l), compute Vx recursively through interpolation on level Cx.l. Do the same for Cy/Vy, and Cz,Vz.

4) For edge vertex Vxy, compute and locate neighbors Cx,Cy, and Cyx. If all those exist on current levels, let Vxy=avg(V,Cx,Cy,Cxy); otherwise recursively interpolate Vx on level min(Cx.l,Cy.l,Cxy.l). Do the same for Vyz and Vxz.

5) For corner vertex Vxyz, compute and locate all 7 neighbors. If all exist on level C.l, let Vxyz=avg(V, Cx, . . . ); else recursively interpolate Vx on level min (Cx.l, . . . ).

6) Tri-linearly interpolate P on octant (V,Vx,Vy, . . . ), and return the value.

In this algorithm, "recursively evaluate V on level L" refers to executing exactly that same algorithm with the only modification that the cell location used in step 1 does not find the leaf cell on the finest level, but the cell on level L that contains V (and that, of course, it operates on the position of the specified V, not on P). The scheme can be shown to terminate, and to be continuous and smooth, but this exceeds this IDF.

Rendering

This interpolation scheme may be used in any sample-based direct volume renderer such as the sample-based direct volume renderer 1702 illustrated in FIGS. 17A-B. The scheme is fully compatible with other techniques like pre-integration, application of transfer functions, computation of finite difference gradients, etc.

In addition, in one embodiment, these techniques are used for computing implicit iso-surfaces. To do so a ray may be traced through the set of all cell octants, and intersected with the tri-linear interpolant defined by the respective octants' vertex Values C,Vx,Vy, . . . etc.

Variants of the Octant Method

In one embodiment the octant method is modified as follows: First, we find the octant O as described above. Second, we determine its corresponding dual cell D and find the 8 CECs for this dual cell's vertices Cx, Cy, . . . Cxy, etc. For each of the octant vertices Vx, Vy, . . . Vxy, . . . etc we then proceed as follows:

a) For the side neighbor Vx: If the respective neighbor Cx of Vx exists and is a leaf cell, then Vx does not lie on a boundary, and is set to the average of C and Vx (same as above). If Cx is a inner cell, then Vx lies on boundary (with C on the finer side and Cx on the coarser). In this case we compute the value of Vx by recursively using this octant method in Cx, for position Vx. If neither of these cases applies Vx must be on the coarser side of a boundary, in which case we use a method 'coarseFill (Vx)' as described below. For the other side neighbors Vy and Vz we perform accordingly.

b) For the octant edge vertex Vxy we look at all the neighbor cells that touch Vxy, which are Cx,Cy, and Cxy. If all of those cells are leaf cells on the current level we are not at a boundary, and set Vxy to the average of C,Cx,Cy,and Cxy (same as above). If either of these three neighbor cells is a inner cell then Vxy lies on at least one boundary. In this case we find the coarsest of these three cells, and recursively perform the octant method for Vxy in this coarsest neighbor. If neither of these two cases applied we must be on the coarser side of at least one level boundary. In this case, we set the value of Vxy using the 'coarseFill' method as described below. For the other edge neighbors Vyz and Vxz we perform accordingly.

c) For the corner vertex Vxyz we perform similarly to 'b', except that we consider all neighbor cells Cx, Cy, . . . Cyx, . . . Cyz. Again we use averaging if we're not on a boundary, use recursive execution in the coarsest neighbor if at least one neighbor is a inner node, and use 'coarseFill' if neither of these two cases applied.

In one instantiation we implement 'coarseFill(P)' using the Hats method as described above. In another instantiation we implement it using the average or weighted average of all leaf cells C that touch P (using, for example, weights based on each C's level). In yet another instantiation we compute coarseFill using the octant method on the coarsest cell touching P. Finally, in one instantiation we compute coarseFill by the average of C and the given neighbors (Cx for Vx; Cx,Cy, and Cxy for Vxy, etc) irrespective of which level they are on.

III. Data Structures and Algorithms to Efficiently Store and Query Cells and Dual Cells As illustrated in FIG. 17A, one embodiment of the AMR with multi-octree processing logic 1710 includes a "multi-octree" data structure generator 1712 that transforms BC-AMR data 1711 into a multi-octree data structure. Similarly, as shown in FIG. 17B, one embodiment of the AMR with KD-tree processing logic 1750 includes a KD-tree data structure generator 1752 that transforms the BC-AMR data 1711 into a KD-tree data structure. As discussed below, both embodiments simplify reasoning related to neighbors, parents, children, etc., of a given cell (as described herein). An interpolation module 1713 then implements a specific interpolation scheme based on this data structure that is both smooth and continuous and that relies on repeated trilinear interpolation. A ray tracing-based rendering module 1713 then uses this interpolation scheme to render BC-AMR data.

1. Multi-Octree Data Structures

As the embodiments of the invention rely on repeatedly interpolating values from neighboring cells, a technique of reasoning about "neighbors" of cells is needed (even across multiple levels), as well as a fast and efficient way of finding a cell from a sample point, to find the neighbors of a given cell.

We first define a logical space of infinitely nested, progressively refined grids. At the root of this space lies a grid $G(0)$ of $Nx*Ny*Nz$ logical size 1. If each such cell was split into $2\times2\times2$ cells we would end up with a grid $G(1)$ of $2Nx*2Ny*2Nz$ cells of size 0.5. Similarly, at level n we would have grid $G(n)$ of $2^nNx*2^nNy*2^nNz$ of side $2^{-n}$. We enumerate the cells of this infinite scoping of grids as $(l,j,k)(m)$, where m is the grid level, and $(l,j,k)$ is the index in $G(m)$. Using this we can easily argue about neighbors, parent, and children: Each node $(ijk)(m)$ has the 8 children $(2i+\{0,1\},2j+\{0,1\},2k+\{0,1\})(m+1)$, the parent $(i/2,j/2,k/2)(m-1)$, and obvious neighbors.

While this space is easy to reason with, an infinite number of cells does not lend well to a concrete implementation. However, rather than seeing $G(1)$ as a grid of $2Nx*2Ny*2Nz$ cells these same cells can be arranged in $Nx*Ny*Nz$ blocks of $2\times2\times2$ cells that all have a common parent (same for other levels). As such, the same data structure can be encoded as a grid of $Nx*Ny*Nz$ root nodes that each point to their $2\times2\times2$ children—or use a NULL pointer to indicate a leaf. In addition, each node can also store a data value. Obviously, any cell in this multi-octree maps to an index $(l,j,k)(m)$ in the virtual nested grid space (though not vice versa). Similarly, the "closest existing leaf cell" can be uniquely defined for any arbitrary index $(ijk)(m)$ (even for those that do not actually exist) as the deepest actually existent leaf node that would have been a predecessor of this virtual node.

Multi-Octree Representation of BC-AMR

Due to the properties of BC—in particular, that any grid cell on any level is either not covered at all by another grid on a deeper level, or fully covered by it—each BC AMR input is transformed with power-of-two refinement factors into the Multi-Octree data structure. In one embodiment, the values $Nx*Ny*Nz$ are chosen as the dimensions of the BC-AMR root grid. Then, assuming a refinement factor of 2 each input grid may be mapped on level m into a range of cell coordinates.

All such nodes can be created in the multi-octree data structure, and filled with the respective input values. For refinement factors of 4 new refinement levels of 2 can be inserted and filled with down-filtered versions of the actual "factor-4" grids. This creates new factor-2 grids that didn't exist in the input, but since all of their cells are eventually overwritten by the factor-4 cells this is not a problem other than a (slight) increase in memory consumption.

Multi-Octree algorithms are readily defined for:

Finding the root node's coordinates $(i0,j0,k0)$ for any giving index $(ijk)(m)$ as $(i0,j0,k0)=(i>>m,j>>m,k>>0)$.

Finding the root node's coordinates for a given 3D position $P=(x,y,z)$ by projecting it into the logical grid and computing the integer coordinates of this cell.

Finding the closest existing node for a given index $(ijk)(m)$ by starting at $(ijk)(m)$'s root node and following its corresponding octree until either level m is reached, or a leaf node is reached. A pointer is reported to that node and the actual found index. In one instantiation, in any given level m we select the octree's respective child node by looking at the m'th bits of indices i, j, and k.

Finding the level of any given node by returning its level index, m.

Finding the leaf cell (ijk)(m) for any point P=(x,y,z) by projecting it into the root grid, finding the root node for P, and walking its corresponding octree until a leaf is found.

Finding the respective CEL each for a number of different points P0,P1, . . . Pn (for example, the 8 vertices of a dual cell D). In one instantiation we achieve this using the steps:
 a) create a list of query points yet to be processed, and initialize it to P0,P1, . . . Pn.
 b) Take one point P from this list, and find the CEL L for P as described above.
 c) Find all points P' in the list that map to the given leaf cell L, and return L as answer for those P's queries. Remove all such P' from the list
 d) Iterate to b' until the list is empty.
 In one instantiation, we perform this operation using vector instructions to process multiple P's in parallel.

Figure 18B:
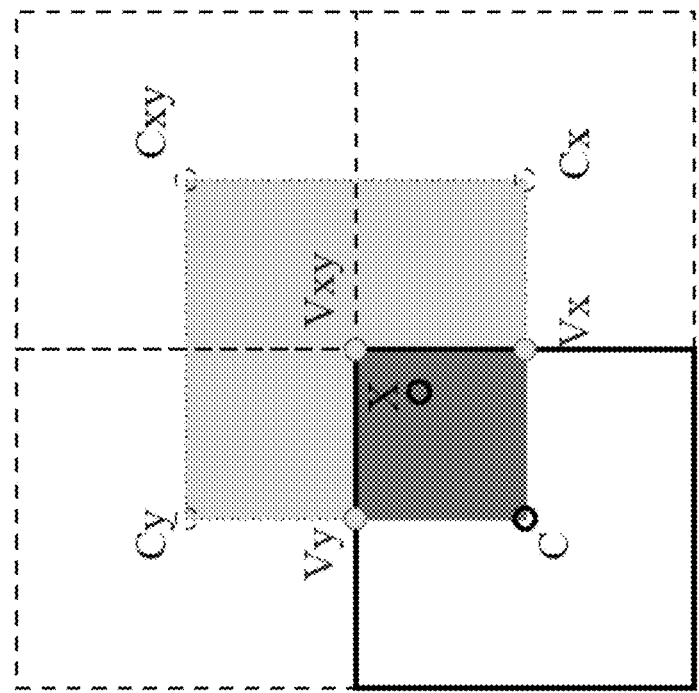
FIGS. 18A-B illustrate exemplary geometry for a cell, one of its octants, the vertices thereof, and neighbor cells.
Figure 18A:
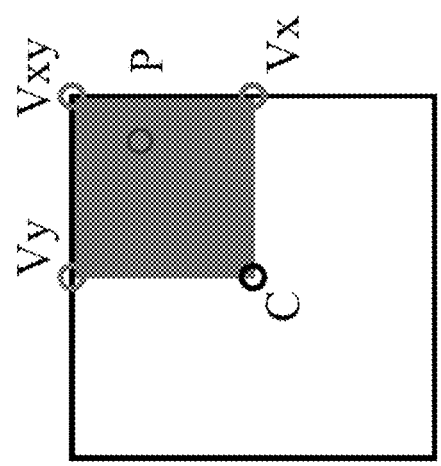

FIGS. 18A-B illustrate an exemplary geometry for a cell, one of its octants, the vertices thereof, and neighbor cells. In FIG. 18A, for each leaf cell C, any point P can be assigned one of the 8 octants defined by the cell's center point, C. That octant (in 3D) has 3 face neighbors Vx,Vy,Vz, 3 edge neighbors Vxy,Vxz,Vyz, and 1 corner neighbor Vxyz. Specifying scalar values for these points allows trilinear interpolation inside this octant. In FIG. 18B, for each octant, each cell has 7 "logical" neighbor cells on the level of C, named Cx,Cy, etc (though they may not actually exist, they will have a parent that does). The given octant lies at the intersection of the cell and that dual cell spanned by the neighbors, allowing the values at V to be defined in a way that satisfies the desired interpolation criteria.

Possible Extensions

A variety of extensions may be implemented. For example, these techniques may be used to render octree data (e.g., sparse voxel octrees). Any structured volume can be represented in the form of multi-octree, using either lossy or lossless compression. This means the technique can be used to render octree-compressed voxel data. These techniques are also applicable to higher order interpolants, such as Wavelet-compressed volume data. For high sample rates, one can use a cache for already-evaluated octants. The costly recursive evaluation only happens at level boundaries. It should be possible to precompute and store all octant vertices at those cell boundaries. The nature of the data structure naturally lends to adaptive sample schemes where the density of volume samples is chosen relative to the cell size at this point.

Refinement factors other than 2 may also be used, as long as each leaf cell is logically subdivided into R×R×R sub-cells (R being the refinement factor). The math and actual algorithm are more convolved, but the same concept applies. The data structure naturally lends to a scheme where inner nodes store more information on their children's values (such as value ranges, value distributions, variance, approximations, etc). These can then be used, for example, for hierarchical culling (iso-surfaces), for space skipping (DVR), adaptively choosing sample rates, etc.

The same scheme can also be used for crack-free iso-surface extraction by operating a "Marching Cubes" variant on the octants of all cells. Other than for visualization, these techniques are useful for rendering other compressed volumetric data (e.g., volumetric effects in movie rendering). Ultimately, these techniques provide a smooth interpolation scheme for general (multi-)octree-like data that can, in principle, go beyond graphics applications (for example, in the simulation codes themselves). These techniques may also be used on non-rectilinear grids.

2. KD-Tree AMR Data Structures

Irrespective or the ray tracing in which the kernels described herein will be used, efficient techniques are needed to compute the cell location kernels they are all built on.

Inspired by the regularity of the implicit grid space, the embodiment illustrated in FIG. 17A and described above in Section 1 used a multi-octree data structure in which an octree with a branching factor of $R^3$ in each node was built for each cell of the root level. The cell location in this octree was simple; and with a branching factor of $R^3$ the memory overhead for inner nodes was relatively low. However, this data structure requires the input data to be reformatted, meaning it will not directly operate on native VTK data, and requires at least one copy of such data.

To avoid this, an alternative embodiment is illustrated in FIG. 17B which includes adaptive mesh refinement with KD-tree processing logic 1750 to perform the operations described below (referred to as "AMR-KDTree"). In this embodiment, the entirety of all bricks (across all levels) are evaluated, and the world space bounding box of these bricks is computed. This space is then recursively partitioned as follows. First, a list of all block boundaries that intersect the space to be partitioned is determined (each such boundary defines an axis-aligned plane). One of those is then picked as a kd-tree partitioning plane such as the one closest to the spatial median. This partitioning plane is then used to partition the current domain into left and right halves.

All blocks in the current region are evaluated and sorted by the AMR with KD-tree processing logic 1750 into those overlapping the left half, and those overlapping the right; those that overlap both (which is possible in B/C AMR) go into both. Finally, left and right halves are recursively processed until no more boundary plane overlaps the current region, in which case, a leaf is generated.

By design, each leaf will contain exactly one brick for each level covered by that leaf's region. These bricks are sorted by descending level, so the first entry is always the finest (i.e., leaf) level, etc. This data structure is very light-weight, and can be built over whatever external memory is used for storing the bricks' voxels. In particular, this data structure can be built over an existing vtkHierarchicalBoxDataSet structure as used by ParaView's and Visit's Chombo readers, without replicating any of the voxels. An obvious alternative is to store bricks by ascending level, with all operations modified accordingly.

The previously mentioned cell location kernels—findLeaf, findCell, etc—are easy to implement on top of this data structure. A kd-tree point location may be performed by the AMR with KD-tree processing logic 1750 for the sample point P until a leaf is reached. In that leaf, the brick B is picked for the desired level, and the resulting voxel lookup performed in this brick's structured voxel grid.

For dual cell lookups, all or at least some of the 8 corner lookups will end up in the same brick quite commonly. This may be exploited in a special kernel that looks up all 8 corners in one traversal similar to the one described for the multi-octree. In one instantiation we achieve this using the steps:
 e) create a list of query points yet to be processed, and initialize it to P0, P1, . . . Pn.
 f) Take one point P from this list, and find the CEL L for P as described above.
 g) Find all points P' in the list that map to the given leaf cell L, and return L as answer for those P's queries. Remove all such P' from the list
 h) Iterate to 'b' until the list is empty.

In one instantiation, we perform this operation using vector instructions to process multiple P's in parallel. In one instantiation we perform this operation for the 8 corners of a dual cell; in another we perform it for an arbiraty number of query points as provided by the application.

IV. Integration with an Exemplary Ray Tracing Framework

Though the reconstruction methods and kernels are generally applicable, for the remainder of this paper we consider an implementation within a particular ray tracing framework, referred to as OSPRay [WJA*16]. OSPRay already provides a ray tracer, a renderer that supports volume ray casting, and with ready abstractions to implement new volume types. To make it support the techniques described herein, the data structures were set up and the kd-tree built; the cell location kernels executed, and the reconstructions performed as described above.

Since OSPRay makes use of ISPC [PM12] for all performance-critical code the cell location and reconstruction kernels were implemented in ISPC; all boilerplate and data structure construction code is written in scalar C++, with data structures shared by both sides. Once the respective ospray::ChomboVolume data type was added, it worked out of the box with OSPRay's renderers.

High-Performance Cell and Dual-Cell Query

For all of the reconstruction kernels described above, the key factor affecting the final rendering performance is how quickly cell and dual cell queries are performed. While the AMR KD-tree processed by the AMR with KD-tree processing logic 1750 provides the right algorithmic infrastructure, a high-performance implementation is critically important. Initially, as a proof of concept, intentionally simple, highly flexible, and purely scalar C++ kernels were used for cell location, and dual-cell queries were implemented via 8 separate cell queries. These kernels worked well, but turned out to be exceedingly costly.

Optimized ISPC Cell Query

To improve on this, these kernels were realized on the ISPC side, always performing N reconstructions (and correspondingly, N cell/-dual cell queries) in parallel (where N is the vector width of the underlying CPU architecture). In addition to such vectorizing these kernels, these kernels were optimized where possible. For example, in one embodiment, rather than operating on logical integer IDs for cells and levels, cells are referenced by their (float) center point and levels by their (float) center width, which not only better utilizes the floating point computations, but also minimizes register pressure and stack space, avoids many costly int-to-float conversions when traversing the data structure, and often allows for utilizing modern vector units' multiply-add capabilities (e.g., even some of the address computations inside each brick can be done in floating point).

In addition, to minimize data divergence (and consequently, lots of costly gathering operations) the cell location was implemented in a "packet" paradigm [WSBW01] in which all N queries stay together while going down the tree; and of course transformed the recursion into a manually maintained stack that gets pushed/popped only when absolutely necessary. These techniques have demonstrated more than an order of magnitude of performance improvement relative to the scalar reference kernels.

Faster Dual-Cell Queries

For the dual-cell query, one embodiment of the AMR with KD-tree processing logic 1750 implements a special variant that is built on the packetized cell location kernel but actually performs all 8 corner queries in a single sweep. To do this, the 8 vertex locations are viewed as the intersection of three sets of parallel planes (the planes that form the boundary of the dual cell) and traversed down the kd-tree. At each kd-tree node, the side of the kd-tree plane the respective query planes lie is determined, and consequently the planes active in a given subtree are tracked with only 6 state variables (of course, only subtrees with at least one active plane in each pair of planes need to be traversed). Once a leaf is reached, the 6 active planes defines which of the 8 corner values are active, and all those can be filled from that leaf.

REFERENCES

[BC89] BERGER M. J., COLELLA P.: Local adaptive mesh refinement for shock hydrodynamics. Journal of computational Physics 82, 1 (1989), 64-84.

[CGL*00] COLELLA P., GRAVES D., LIGOCKI T., MARTIN D., MODIANO D., SERAFINI D., VAN STRAALEN B.: Chombo software package for amr applications-design document, 2000.

[DCH88] DREBIN R. A., CARPENTER L., HANRAHAN P.: Volume rendering. ACM SIGGRAPH Computer Graphics (Proceedings of the 15th annual conference on Computer graphics and interactive techniques—SIGGRAPH '88) 22, 4 (1988).

[FN80] FRANKE R., NIELSON G.: Smooth interpolation of large sets of scattered data. Numerical Methods in Engineering 15 (1980).

[grc] Numerical Relativity with Adaptive mesh.

[LC87] LORENSEN W. E., CLINE H. E.: Marching Cubes: A High Resolution 3D Surface Construction Algorithm. In International Conference on Computer Graphics and Interactive Techniques (1987), pp. 163-169.

[OBB*05] O'SHEA B. W., BRYAN G., BORDNER J., NORMAN M. L., ABEL T., HARKNESS R., KRITSUK A.: Introducing enzo, an amr cosmology application. In Adaptive mesh refinement-theory and applications. Springer, 2005, pp. 341-349.

[PM12] PHARR M., MARK B.: ISPC: A SPMD Compiler for High-Performance CPU Programming. In Proceedings of Innovative Parallel Computing (inPar) (2012), pp. 184-196.

[WFM*05] WALD I., FRIEDRICH H., MARMITT G., SLUSALLEK P., SEIDEL H.-P.: Faster Isosurface Ray Tracing using Implicit KD-Trees. IEEE Transactions on Visualization and Computer Graphics 11, 5 (2005).

[WJA*16] WALD I., JOHNSON G. P., AMSTUTZ J., BROWNLEE C., KNOLL A., JEFFERS J. L., GUENTHER J., NAVRATIL P.: OSPRay—A CPU Ray Tracing Framework for Scientific Visualization. Tech. rep., Intel Corp, 2016. (submitted for publication).

[WSBW01] WALD I., SLUSALLEK P., BENTHIN C., WAGNER M.: Interactive Rendering with Coherent Ray Tracing. Computer Graphics Forum 20, 3 (2001), 153-164. (Proceedings of Eurographics 2001).

[Weber et al] Gunther H. Weber, Oliver Kreylos, Terry J. Ligocki, John M. Shalf, Hans Hagen, Bernd Hamann, and Kenneth I. Joy. Extraction of crack-free isosurfaces from adaptive mesh refinement data. In: David Ebert, Jean M. Favre, and Ronny Peikert, editors, Proceedings of the Joint EUROGRAPHICS and IEEE TCVG Symposium on Visualization, 2001

[Kreylos et al] Remote interactive direct volume rendering of AMR data, Kreylos, Oliver, Weber, Gunther H., Bethel, E. Wes, Shalf, John M. Hamann, Bernd, Joy, Kenneth I., 2002

[Verdiere et al] High-Quality, Semi-Analytical Volume Rendering for AMR Data Stephane Marchesin and Guillaume Colin de Verdiere, IEEE Vis 2009.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processing apparatus comprising:
   a ray-tracing based renderer to render image frames using ray tracing techniques, wherein the rendering of the image frames uses results from an interpolation scheme, wherein the interpolated results are obtained through:
   transforming adaptive mesh refinement (AMR) data into a multi-octree data structure, wherein the AMR data comprises a plurality of cells at a plurality of different levels, and wherein the plurality of cells are logically subdivided into octants to generate the multi-octree data structure,
   implementing the interpolation scheme based on the multi-octree data structure to generate the interpolated results, the interpolation scheme using repeated linear interpolation, wherein the repeated linear interpolation comprising:
   for a given point P, performing the operations of:
      finding a leaf cell L=(Li,Lj,Lk)(Lm), wherein (Li,Lj,Lk)(Lm) is an index of the leaf cell, (Li,Lj,Lk) indicates coordinates of the leaf cell and Lm indicates a level of the leaf cell for P,
      determining the octant of L that P lies in, defining seven new data points of the octant, the seven new data points coinciding with the boundaries of L,
      computing an index of each logical face neighbor of L in the x, y and z directions, locating the closest cell for that index, and recursively determining a new data point of the octant corresponding to the closest cell for that index,
      for a new data point of the octant that is an edge vertex, computing and locating all three neighbors of the edge vertex, and recursively determining that data point based on the three neighbors,
      for a new data point of the octant that is a corner vertex, computing and locating all seven neighbors of the corner vertex, and recursively determining that data point based on the seven neighbors, and
      tri-linearly interpolating P on the octant based on the seven new data points, and returning the interpolated value, and
   using the interpolated results to render image frames using ray tracing techniques.

2. The graphics processing apparatus as in claim 1 wherein the multi-octree data structure is to generalize types of data used in an AMR data structure.

3. The graphics processing apparatus as in claim 1 wherein the AMR data comprises BC (Berger and Colella)-AMR data.

4. The graphics processing apparatus as in claim 1 wherein the transforming the adaptive AMR data is to transform each AMR data input with power-of-two refinement factors into the multi-octree data structure.

5. A method comprising:
   transforming adaptive mesh refinement (AMR) data into a multi-octree data structure, wherein the AMR data comprises a plurality of cells at a plurality of different levels, and wherein the plurality of cells are logically subdivided into octants to generate the multi-octree data structure;

implementing an interpolation scheme based on the multi-octree data structure to generate interpolated results, the interpolation scheme using repeated linear interpolation, wherein the repeated linear interpolation comprises, for a given point P, performing the operations of:
finding a leaf cell L=(Li,Lj,Lk)(Lm), wherein (Li,Lj,Lk)(Lm) is an index of the leaf cell, (Li,Lj,Lk) indicates coordinates of the leaf cell and Lm indicates a level of the leaf cell for P,
determining the octant of L that P lies in, defining seven new data points of the octant, the seven new data points coinciding with the boundaries of L,
computing an index of each logical face neighbor of L in the x, y and z directions, locating the closest cell for that index, and recursively determining a new data point of the octant corresponding to the closest cell for that index,
for a new data point of the octant that is an edge vertex, computing and locating all three neighbors of the edge vertex, and recursively determining that data point based on the three neighbors,
for a new data point of the octant that is a corner vertex, computing and locating all seven neighbors of the corner vertex, and recursively determining that data point based on the seven neighbors, and
tri-linearly interpolating P on the octant based on the seven new data points, and returning the interpolated value; and
performing ray tracing to render image frames using the interpolated results.

6. The method as in claim 5 wherein the multi-octree data structure is to generalize types of data used in an AMR data structure.

7. The method as in claim 5 wherein the AMR data comprises BC (Berger and Colella)-AMR data.

8. The method as in claim 5 wherein transforming further comprises:
transforming each AMR data input with power-of-two refinement factors into the multi-octree data structure.

* * * * *